(12) United States Patent
Iwane

(10) Patent No.: US 11,314,077 B2
(45) Date of Patent: Apr. 26, 2022

(54) ENDOSCOPE SYSTEM AND METHOD OF OPERATING THE SAME

(71) Applicant: FUJIFILM Corporation, Tokyo (JP)

(72) Inventor: Kosuke Iwane, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 110 days.

(21) Appl. No.: 17/016,970

(22) Filed: Sep. 10, 2020

(65) Prior Publication Data

US 2021/0072529 A1 Mar. 11, 2021

(30) Foreign Application Priority Data

Sep. 11, 2019 (JP) .............................. JP2019-165341

(51) Int. Cl.
*G02B 23/26* (2006.01)
*G02B 23/24* (2006.01)

(52) U.S. Cl.
CPC ....... *G02B 23/2461* (2013.01); *G02B 23/243* (2013.01); *G02B 23/2484* (2013.01)

(58) Field of Classification Search
CPC .............. G02B 23/2461; G02B 23/243; G02B 23/2484

USPC .......................................................... 348/68
See application file for complete search history.

(56) References Cited

U.S. PATENT DOCUMENTS

2014/0031623 A1* 1/2014 Kagaya ................ A61B 1/0653
600/109

FOREIGN PATENT DOCUMENTS

JP 2007-139822 A 6/2007
JP 2009-201593 A 9/2009

* cited by examiner

*Primary Examiner* — Nguyen T Truong
(74) *Attorney, Agent, or Firm* — Studebaker & Brackett PC

(57) ABSTRACT

A display control unit performs at least one of the change of the display contents of a light amount level-display section on a light amount display screen in conjunction with the selection of a specific emphasis/suppression mode from a plurality of emphasis/suppression modes, the change of the display contents of the light amount level-display section in conjunction with change of the display contents of an emphasis/suppression amount-display section on an emphasis/suppression mode-selection screen, or the change of the display contents of the emphasis/suppression amount-display section in conjunction with the change of the display contents of the light amount level-display section.

17 Claims, 12 Drawing Sheets

| | ΔV | ΔB | ΔG | ΔR |
|---|---|---|---|---|
| BLOOD VESSEL EMPHASIS MODE | +10% | ±0% | +5% | ±0% |
| RESIDUE SUPPRESSION MODE | −10% | ±0% | −5% | ±0% |
| SURFACE-LAYER STRUCTURE EMPHASIS MODE | +10% | +5% | ±0% | ±0% |
| STOMACH OBSERVATION MODE | ±0% | ±0% | +5% | +3% |
| CV EMPHASIS MODE | ±0% | ±0% | ±0% | ±5% |

FIG. 8

|  | ΔV | ΔB | ΔG | ΔR |
|---|---|---|---|---|
| BLOOD VESSEL EMPHASIS MODE | +10% | ±0% | +1% | ±0% |
| RESIDUE SUPPRESSION MODE | −10% | ±0% | −1% | ±0% |
| SURFACE-LAYER STRUCTURE EMPHASIS MODE | +10% | +5% | ±0% | ±0% |
| STOMACH OBSERVATION MODE | ±3% | ±5% | +5% | +3% |
| CV EMPHASIS MODE | ±0% | ±0% | ±0% | ±0% |

FIG. 9

|  | ΔV | ΔB | ΔG | ΔR |
|---|---|---|---|---|
| BLOOD VESSEL EMPHASIS MODE | +10% | ±0% | +3% | ±0% |
| RESIDUE SUPPRESSION MODE | −10% | ±0% | −3% | ±0% |
| SURFACE-LAYER STRUCTURE EMPHASIS MODE | +10% | +5% | ±0% | ±0% |
| STOMACH OBSERVATION MODE | ±3% | ±5% | +5% | +3% |
| CV EMPHASIS MODE | ±0% | ±0% | ±0% | ±0% |

|  | R GAIN FOR SINGLE COLOR | G GAIN FOR SINGLE COLOR | B GAIN FOR SINGLE COLOR |
|---|---|---|---|
| VIOLET LIGHT V-SINGLE COLOR LIGHT EMISSION | 1.2 | 1.0 | 0.3 |
| BLUE LIGHT B-SINGLE COLOR LIGHT EMISSION | 1.2 | 1.0 | 0.3 |
| GREEN LIGHT G-SINGLE COLOR LIGHT EMISSION | 2.1 | 1.0 | 2.3 |
| RED LIGHT R-SINGLE COLOR LIGHT EMISSION | 0.3 | 1.0 | 2.2 | ized
ENDOSCOPE SYSTEM AND METHOD OF OPERATING THE SAME

CROSS-REFERENCE TO RELATED APPLICATIONS

This application claims priority under 35 U.S.C § 119(a) to Japanese Patent Application No. 2019-165341 filed on 11 Sep. 2019. The above application is hereby expressly incorporated by reference, in its entirety, into the present application.

BACKGROUND OF THE INVENTION

1. Field of the Invention

The present invention relates to an endoscope system comprising a plurality of semiconductor light sources and a method of operating the endoscope system.

2. Description of the Related Art

An endoscope system comprising a light source device, an endoscope, and a processor device has been widely used in recent years (for example, JP2007-139822A and JP2009-201593A). In the endoscope system, an object to be observed is irradiated with illumination light from the endoscope, and the image of the object to be observed is displayed on a monitor on the basis of RGB image signals that are obtained in a case where the image of the object to be observed, which is being illuminated with the illumination light, is picked up by an image pickup element of the endoscope.

Further, an endoscope system provided with a light source device including a plurality of semiconductor light sources emitting illumination light of a plurality of wavelength ranges is used. In such an endoscope system, illumination light having various colors can be emitted by the adjustment of the light amount ratios of the illumination light of the plurality of wavelength ranges. For example, JP2007-139822A discloses that an object to be observed is illuminated using a LED for visible light and a LED for ultraviolet light.

SUMMARY OF THE INVENTION

In JP2007-139822A, the display of an indicator, which displays the level of the amount of light stepwise, is performed for each of the LED for visible light and the LED for ultraviolet light. Even in a case where semiconductor light sources emitting light having a plurality of colors are used, it is preferable that the level of the amount of illumination light emitted from each semiconductor light source is displayed by a light amount level-display section as in JP2007-139822A. Further, even in a case where the light amount ratios of illumination light are adjusted to change the amount of emphasis/suppression for an object to be observed with regard to the emphasis of blood vessels or the like, it is preferable that the display contents of the light amount level-display section for each illumination light is changed according to the amount of emphasis/suppression for the object to be observed. However, JP2007-139822A does not disclose or suggest that the display contents of the light amount level-display section for each illumination light are changed according to the amount of emphasis/suppression. Furthermore, JP2009-201593A discloses that the amount of emphasis/suppression for an object to be observed is displayed stepwise as with IHb emphasis or infrared emphasis, but does not disclose or suggest that the display contents of the light amount level-display section for each illumination light are changed according to the amount of emphasis/suppression.

An object of the invention is to provide an endoscope system and a method of operating the endoscope system that can change the display contents of a light amount level-display section for each illumination light emitted from each semiconductor light source according to the amount of emphasis/suppression for an object to be observed in a case where a plurality of semiconductor light sources are used.

An endoscope system according to an aspect of the invention comprises a display control unit. The display control unit allows a display unit to display at least one of a light amount display screen which is used to display light amount ratios representing levels of relative amounts of illumination light of a plurality of wavelength ranges emitted from a plurality of semiconductor light sources and includes a light amount level-display section displaying the level of the amount of each illumination light and on which display contents of the light amount level-display section including the level of the amount of each illumination light are changed according to a light amount-adjustment instruction, or an emphasis/suppression mode-selection screen which is used to select a specific emphasis/suppression mode from a plurality of emphasis/suppression modes and includes an emphasis/suppression amount-display section displaying amounts of emphasis for the emphasis/suppression modes and on which display contents of the emphasis/suppression amount-display section are changed according to an emphasis/suppression amount-setting instruction. The display control unit performs at least one of change of the display contents of the light amount level-display section in conjunction with selection of the specific emphasis/suppression mode, change of the display contents of the light amount level-display section in conjunction with change of the display contents of the emphasis/suppression amount-display section, or change of the display contents of the emphasis/suppression amount-display section in conjunction with change of the display contents of the light amount level-display section.

It is preferable that the display unit displays both the light amount display screen and the emphasis/suppression mode-selection screen. It is preferable that, in a case where an operation is capable of being performed on the emphasis/suppression mode-selection screen, the display control unit performs the change of the display contents of the light amount level-display section in conjunction with the selection of the specific emphasis/suppression mode or performs the change of the display contents of the light amount level-display section in conjunction with the change of the display contents of the emphasis/suppression amount-display section; and it is preferable that, in a case where an operation is capable of being performed on the light amount display screen, the display control unit performs the change of the display contents of the emphasis/suppression amount-display section in conjunction with the change of the display contents of the light amount level-display section.

It is preferable that a plurality of light emission modes in which light amount ratios of a plurality of kinds of illumination light are different from each other are provided, and the light amount display screen is provided for each of the light emission mode and the display control unit changes the display contents of the light amount level-display section on the light amount display screen corresponding to the light emission mode in conjunction with switching of the light emission mode.

It is preferable that the endoscope system further comprises an image acquisition unit acquiring image signals obtained in a case where an image of an object to be observed illuminated with a plurality of kinds of illumination light emitted from the plurality of semiconductor light sources is picked up, and an image processing content-changing unit changing contents of image processing for the image signals in a case where the light amount-adjustment instruction is issued. It is preferable that the image processing content-changing unit changes a R-white balance gain coefficient, a G-white balance gain coefficient, and a B-white balance gain coefficient, which are to be multiplied by the image signals, as the contents of the image processing.

It is preferable that the endoscope system further comprises: a white balance gain storage section for a single color that stores a R-white balance gain coefficient for a single color, a G-white balance gain coefficient for a single color, and a B-white balance gain coefficient for a single color obtained in a case where light is emitted only from each semiconductor light source; and a white balance gain calculation section that calculates the R-white balance gain coefficient, the G-white balance gain coefficient, and the B-white balance gain coefficient on the basis of changed light amount ratios of the plurality of kinds of illumination lights, the R-white balance gain coefficient for a single color, the G-white balance gain coefficient for a single color, and the B-white balance gain coefficient for a single color in a case where the light amount ratios are changed according to the light amount-adjustment instruction. It is preferable that the image processing content-changing unit changes a R gain coefficient for adjusting a mucous membrane color, a G gain coefficient for adjusting a mucous membrane color, and a B gain coefficient for adjusting a mucous membrane color, which are to be multiplied by the image signals, as the contents of the image processing.

It is preferable that the endoscope system further comprises a specific light amount ratio-calculation unit analyzing the image signals and calculating specific light amount ratios corresponding to the object to be observed and light amount ratios of the illumination light are changed to the specific light amount ratios according to the light amount-adjustment instruction. It is preferable that the plurality of semiconductor light sources include a V-LED, a B-LED, a G-LED, and a R-LED.

A method of operating an endoscope system according to another aspect of the invention comprises a step of causing a display control unit to perform control such that a display unit displays at least one of a light amount display screen which is used to display light amount ratios representing levels of the relative amounts of illumination light of a plurality of wavelength ranges emitted from a plurality of semiconductor light sources and includes a light amount level-display section displaying the level of the amount of each illumination light and on which display contents of the light amount level-display section including the level of the amount of each illumination light are changed according to a light amount-adjustment instruction, or an emphasis/suppression mode-selection screen which is used to select a specific emphasis/suppression mode from a plurality of emphasis/suppression modes and includes an emphasis/suppression amount-display section displaying amounts of emphasis for the emphasis/suppression modes and on which display contents of the emphasis/suppression amount-display section are changed according to an emphasis/suppression amount-setting instruction. At least one of change of the display contents of the light amount level-display section in conjunction with selection of the specific emphasis/suppression mode, change of the display contents of the light amount level-display section in conjunction with change of the display contents of the emphasis/suppression amount-display section, or change of the display contents of the emphasis/suppression amount-display section in conjunction with change of the display contents of the light amount level-display section is performed in the step of causing the display control unit to perform control.

According to the invention, it is possible to change the display contents of a light amount level-display section for each illumination light emitted from each semiconductor light source according to the amount of emphasis/suppression for an object to be observed in a case where a plurality of semiconductor light sources are used.

BRIEF DESCRIPTION OF THE DRAWINGS

FIG. 8 is a diagram showing the amounts of light to be adjusted with respect to the reference amounts of light for the respective emphasis/suppression modes in a first illumination light emission mode.

FIG. 9 is a diagram showing the amounts of light to be adjusted with respect to the reference amounts of light for the respective emphasis/suppression modes in a second illumination light emission mode.

DESCRIPTION OF THE PREFERRED EMBODIMENTS

Figure 1:
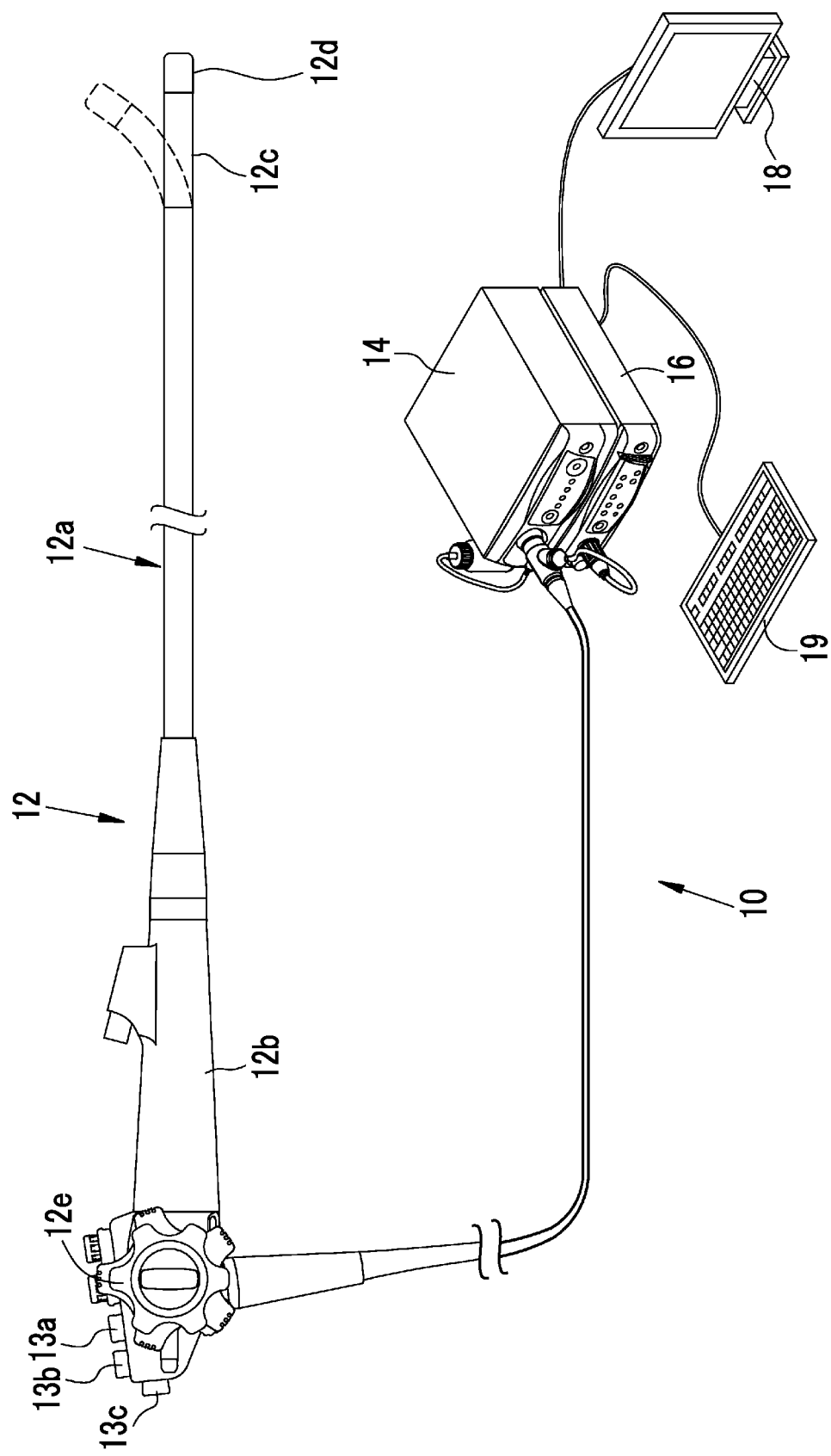
FIG. 1 is a diagram showing the appearance of an endoscope system.

As shown in FIG. 1, an endoscope system 10 includes an endoscope 12, a light source device 14, a processor device 16, a monitor 18 (display unit), and a user interface 19. The endoscope 12 is optically connected to the light source device 14, and is electrically connected to the processor device 16. The endoscope 12 includes an insertion part 12*a* that is to be inserted into an object to be examined, an operation part 12*b* that is provided at the proximal end portion of the insertion part 12*a*, and a bendable part 12*c* and a distal end part 12*d* that are provided on the distal end side of the insertion part 12*a*. In a case where angle knobs 12*e* of the operation part 12*b* are operated, the bendable part 12*c* is operated to be bent. As the bendable part 12*c* is operated to be bent, the distal end part 12*d* faces in a desired direction. The user interface 19 includes a mouse and the like in addition to a keyboard shown in FIG. 1.

Further, the operation part 12*b* is provided with a light emission mode-changeover switch (SW) 13*a*, an emphasis/suppression mode-changeover switch (SW) 13*b*, and a static image-acquisition instruction unit 13*c* in addition to the angle knobs 12*e*. The endoscope system 10 has a plurality of light emission modes in which the light amount ratios of illumination light are different from each other. The light emission mode-changeover SW 13*a* is used for an operation for switching three kinds of light emission modes, that is, a normal light emission mode, a first special light emission mode, and a second special light emission mode. The static image of an image is stored in a static image storage unit (not shown) provided in the processor device 16 by the operation of the static image-acquisition instruction unit 13*c*.

The normal light emission mode is a mode where a normal image, which is obtained in a case where the image of an object to be observed illuminated with normal light corresponding to white light is picked up, is displayed on the monitor 18. The first illumination light emission mode is a mode where a first image, which is obtained in a case where the image of the object to be observed illuminated with first illumination light is picked up, is displayed on the monitor 18. The first illumination light is light of which the amount of light having a short wavelength, such as violet light, is larger than the amounts of light having other wavelengths. The second illumination light emission mode is a mode where a second image, which is obtained in a case where the image of the object to be observed illuminated with second illumination light is picked up, is displayed on the monitor 18. The second illumination light is light of which the amount of light having a short wavelength or a medium wavelength, such as green light, is larger than the amounts of light having other wavelengths.

The endoscope system 10 has a plurality of emphasis/suppression modes where a specific object to be observed or a specific region of interest among a plurality of objects to be observed or a plurality of regions of interest is emphasized or suppressed by the fine adjustment of light amount ratios in each light emission mode. The emphasis/suppression mode-changeover SW 13*b* is used for an operation for switching emphasis/suppression modes, such as a blood vessel emphasis mode, a residue suppression mode, a surface-layer structure emphasis mode, a stomach observation mode, and a crystal violet (CV) emphasis mode.

The blood vessel emphasis mode is a mode where the amount of light having a wavelength of 410 nm or 550 nm of which the amount absorbed by hemoglobin included in the blood vessels is large is made to be larger than the amount of light corresponding to a reference state to increase the visibility of blood vessels in an image. The residue suppression mode is a mode where the amount of light having a wavelength of 410 nm or 550 nm of which the amount absorbed by a residue is large is made to be smaller than the amount of light corresponding to the reference state to reduce the visibility of blood vessels in an image since a residue, such as bile, is often obstructive to diagnosis. The surface-layer structure emphasis mode is a mode where the amount of light having a wavelength of 410 nm or 550 nm is made to be larger than the amount of light corresponding to the reference state to increase the visibility of surface-layer structures, such as fine glandular structures.

The stomach observation mode is a mode where the amount of light of a green-light wavelength range is made to be larger than the amounts of light of other wavelength ranges to allow a user to observe the inside of the stomach in a bright state. The CV emphasis mode is a mode where the amount of light having a component corresponding to a red-light wavelength range is increased to increase the visibility of crystal violet in a case where crystal violet (Pyoktanin), which has optical reflectivity equal to or higher than a certain level in a wavelength range of about 470 nm or less and a wavelength range of about 640 nm or more, is used to emphasize and display an abnormal portion, such as a lesion region.

The processor device 16 is electrically connected to the monitor 18 and the user interface 19. The monitor 18 outputs and displays image information and the like. The user interface 19 receives an input operation, such as function settings. An external recording unit (not shown), which records image information and the like, may be connected to the processor device 16.

Figure 2:
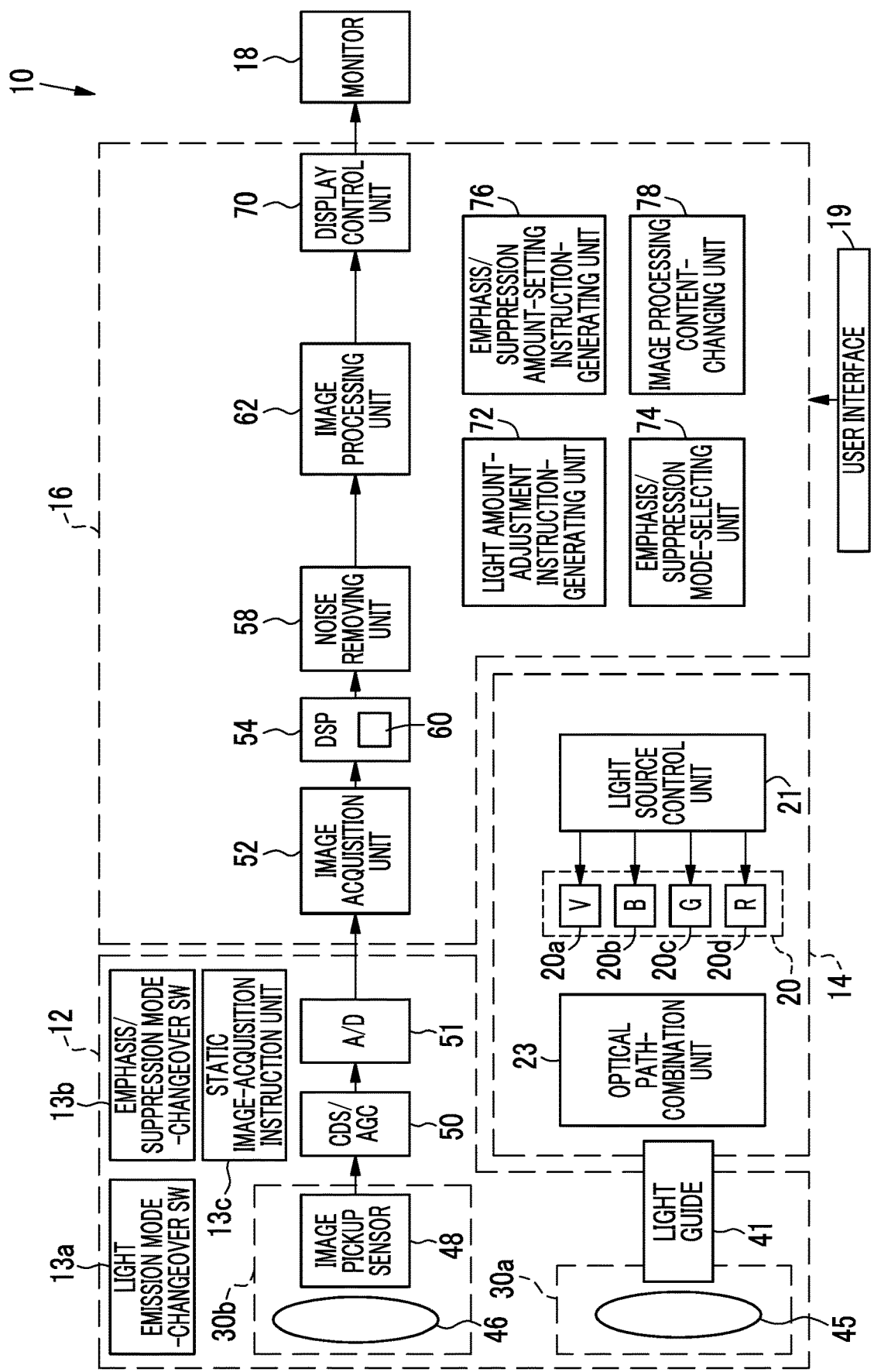
FIG. 2 is a block diagram showing the functions of the endoscope system.

As shown in FIG. 2, the light source device 14 includes a light source unit 20, a light source control unit 21, and an optical path-combination unit 23. The light source unit 20 comprises a plurality of semiconductor light sources that emit illumination light of a plurality of wavelength ranges. Specifically, the light source unit 20 includes a violet light emitting diode (V-LED) 20*a*, a blue light emitting diode (B-LED) 20*b*, a green light emitting diode (G-LED) 20*c*, and a red light emitting diode (R-LED) 20*d*. The light source control unit 21 controls the drive of the LEDs 20*a* to 20*d*. The optical path-combination unit 23 combines the optical paths of four kinds of color light that are emitted from the four color LEDs 20*a* to 20*d*. The inside of an object to be examined is irradiated with the pieces of light, which are combined by the optical path-combination unit 23, through a light guide 41 inserted into the insertion part 12*a* and an illumination lens 45. A laser diode (LD) may be used instead of the LED.

Figure 3:
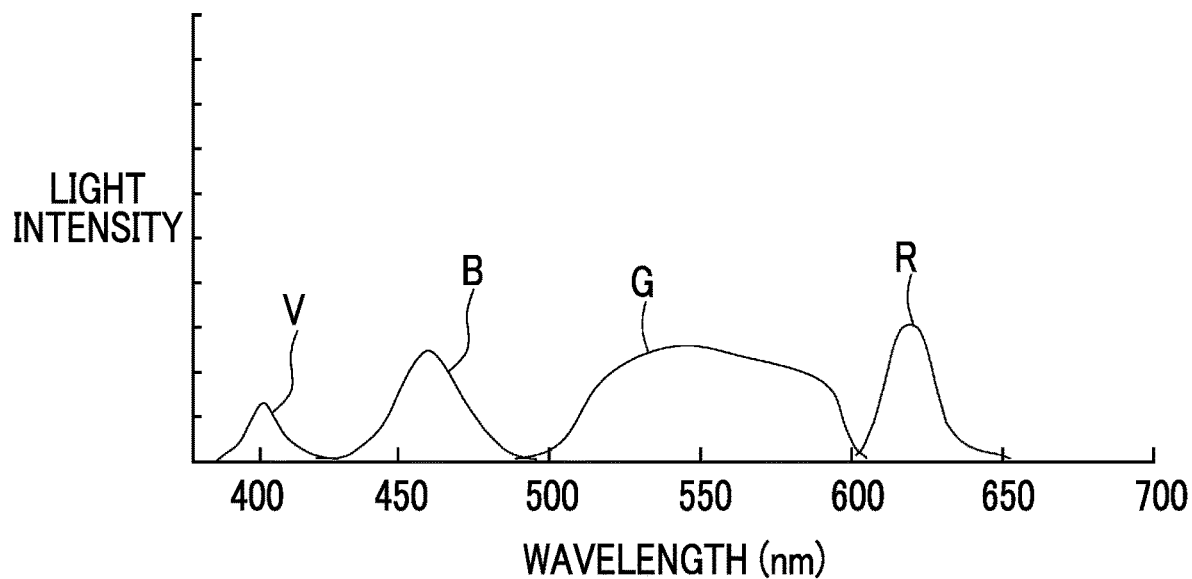
FIG. 3 is a graph showing the light emission spectra of violet light V, blue light B, green light G, and red light R.

As shown in FIG. 3, the V-LED 20*a* generates violet light V of which the central wavelength is in the range of 405±10 nm and the wavelength range is in the range of 380 to 420 nm. The B-LED 20*b* generates blue light B of which the central wavelength is in the range of 460±10 nm and the wavelength range is in the range of 420 to 500 nm. The G-LED 20*c* generates green light G of which the wavelength range is in the range of 480 to 600 nm. The R-LED 20*d* generates red light R of which the central wavelength is in the range of 620 to 630 nm and the wavelength range is in the range of 600 to 650 nm.

The light source control unit 21 controls the V-LED 20a, the B-LED 20b, the G-LED 20c, and the R-LED 20d. Further, the light source control unit 21 controls the respective LEDs 20a to 20d so that the normal light of which the reference light amount ratios of violet light V, blue light B, green light G, and red light R are Vc:Bc:Gc:Rc is emitted in the normal light emission mode as illumination light for the normal light emission mode. The light amount ratios of the normal light can be adjusted with respect to the reference light amount ratios Vc:Bc:Gc:Rc.

Furthermore, the light source control unit 21 controls the respective LEDs 20a to 20d so that the first illumination light of which the reference light amount ratios of violet light V, blue light B, green light G, and red light R are Vs1:Bs1:Gs1:Rs1 is emitted in the first illumination light emission mode as illumination light for the first illumination light emission mode. It is preferable that the light intensity of violet light V of the first illumination light is made to be higher than the light intensities of blue light B, green light G, and red light R thereof. The light amount ratios of the first illumination light can be adjusted with respect to the reference light amount ratios Vs1:Bs1:Gs1:Rs1.

Moreover, the light source control unit 21 controls the respective LEDs 20a to 20d so that second illumination light of which the reference light amount ratios of violet light V, blue light B, green light G, and red light R are Vs2:Bs2:Gs2:Rs2 is emitted in the second illumination light emission mode as illumination light for the second illumination light emission mode. It is preferable that the light intensity of blue light B or green light G of the second illumination light is made to be higher than the light intensity of violet light V or red light R thereof. The light amount ratios of the second illumination light can be adjusted with respect to the reference light amount ratios Vs2:Bs2:Gs2:Rs2.

In this specification, the light amount ratios include a case where the ratio of at least one semiconductor light source is 0 (zero). Accordingly, the light amount ratios include a case where any one or two or more of the respective semiconductor light sources are not turned on. For example, even though only one semiconductor light source is turned on and the other three semiconductor light sources are not turned on as in a case where the light amount ratios of violet light V, blue light B, green light G, and red light R are 1:0:0:0, it is regarded that the light source unit 20 has light amount ratios.

In a case where a light amount-adjustment instruction to adjust the amount of at least one of violet light V, blue light B, green light G, or red light R is issued to the light source device 14 from the processor device 16, the light source control unit 21 controls light sources corresponding to the light amount-adjustment instruction, that is, performs control to adjust the light intensities of V-LED 20a, B-LED 20b, G-LED 20c, and R-LED 20d in each light emission mode.

As shown in FIG. 2, the light guide 41 is built in the endoscope 12 and a universal cord (a cord connecting the endoscope 12 to the light source device 14 and the processor device 16), and transmits the pieces of light, which are combined by the optical path-combination unit 23, to the distal end part 12d of the endoscope 12. A multimode fiber can be used as the light guide 41. For example, a thin fiber cable of which a total diameter of a core diameter of 105 µm, a cladding diameter of 125 µm, and a protective layer forming a covering is in the range of φ0.3 to 0.5 mm can be used.

The distal end part 12d of the endoscope 12 is provided with an illumination optical system 30a and an image pickup optical system 30b. The illumination optical system 30a includes an illumination lens 45, and an object to be observed is irradiated with light transmitted from the light guide 41 through the illumination lens 45. The image pickup optical system 30b includes an objective lens 46 and an image pickup sensor 48. Light reflected from the object to be observed is incident on the image pickup sensor 48 through the objective lens 46. Accordingly, the reflected image of the object to be observed is formed on the image pickup sensor 48.

The image pickup sensor 48 is a color image pickup sensor, and picks up the reflected image of an object to be examined and outputs image signals. It is preferable that the image pickup sensor 48 is a charge coupled device (CCD) image pickup sensor, a complementary metal-oxide semiconductor (CMOS) image pickup sensor, or the like. The image pickup sensor 48 used in the invention is a color image pickup sensor that is used to obtain RGB image signals corresponding to three colors of R (red), G (green), and B (blue), that is, a so-called RGB image pickup sensor that comprises R-pixels provided with R-filters, G-pixels provided with G-filters, and B-pixels provided with B-filters.

The image pickup sensor 48 may be a so-called complementary color image pickup sensor, which comprises complementary color filters corresponding to C (cyan), M (magenta), Y (yellow), and G (green), instead of an RGB color image pickup sensor. In a case where a complementary color image pickup sensor is used, image signals corresponding to four colors of C, M, Y, and G are output. Accordingly, the image signals corresponding to four colors of C, M, Y, and G need to be converted into image signals corresponding to three colors of R, G, and B by complementary color-primary color conversion. Further, the image pickup sensor 48 may be a monochrome image pickup sensor that includes no color filter. In this case, since the light source control unit 21 causes blue light B, green light G, and red light R to be emitted in a time-sharing manner, demosaicing needs to be added to the processing of image pickup signals.

The image signals output from the image pickup sensor 48 are transmitted to a CDS/AGC circuit 50. The CDS/AGC circuit 50 performs correlated double sampling (CDS) or auto gain control (AGC) on the image signals that are analog signals. The image signals, which have been transmitted through the CDS/AGC circuit 50, are converted into digital image signals by an analog/digital converter (A/D converter) 51. The digital image signals, which have been subjected to A/D conversion, are input to the processor device 16.

The processor device 16 comprises an image acquisition unit 52, a digital signal processor (DSP) 54, a noise removing unit 58, an image processing unit 62, a display control unit 70, a light amount-adjustment instruction-generating unit 72, an emphasis/suppression mode-selecting unit 74, an emphasis/suppression amount-setting instruction-generating unit 76, and an image processing content-changing unit 78.

The image acquisition unit 52 acquires an observation image that is obtained in a case where the image of the object to be observed is picked up in the endoscope 12. Specifically, digital color image signals obtained from the endoscope 12 are input to the image acquisition unit 52 as an observation image. The color image signals are formed of red signals that are output from the R-pixels of the image pickup sensor 48, green signals that are output from the G-pixels of the image pickup sensor 48, and blue signals that are output from the B-pixels of the image pickup sensor 48.

The image acquisition unit 52 acquires image signals for the normal light, which are obtained in a case where the image of the object to be observed illuminated with the normal light is picked up, in the normal light emission mode. Further, the image acquisition unit 52 acquires first image signals, which are obtained in a case where the image of the object to be observed illuminated with the first illumination light is picked up, in the first illumination light emission mode. Furthermore, the image acquisition unit 52 acquires second image signals, which are obtained in a case where the image of the object to be observed illuminated with the second illumination light is picked up, in the second illumination light emission mode.

The DSP 56 performs various kinds of signal processing, such as defect correction processing, offset processing, white balance processing, demosaicing processing, linear matrix processing, and gamma conversion processing, on the received image signals. Signals of defective pixels of the image pickup sensor 48 are corrected in the defect correction processing. Dark current components are removed from the image signals having been subjected to the defect correction processing in the offset processing, so that an accurate zero level is set. The white balance processing is performed by a white balance processing unit 60 and the image signals having been subjected to the offset processing are multiplied by a gain coefficient in the white balance processing, so that signal levels are adjusted.

The demosaicing processing (also referred to as equalization processing or demosaicing) is performed on the image signals having been subjected to the white balance processing, so that signals of colors deficient in each pixel are generated by interpolation. All the pixels are made to have the signals of the respective colors by this demosaicing processing. The linear matrix processing for improving color reproducibility is performed on the image signals having been subjected to the demosaicing processing. After that, brightness or saturation is adjusted by the gamma conversion processing.

The noise removing unit 58 performs noise removal processing (for example, a moving-average method, median filtering, or the like) on the image signals, which have been subjected to gamma correction and the like by the DSP 56, to remove noise from the image signals. The image signals from which noise has been removed are transmitted to the image processing unit 62.

The image processing unit 62 performs image processing for the normal image on the image signals for the normal light in a case where a light emission mode is set to the normal light emission mode. The image processing for the normal image includes structure emphasis processing or tone emphasis processing for the normal image and the like. The image signals for the normal light having been subjected to the image processing for the normal image are input to the display control unit 70 as the normal image. Further, the image processing unit 62 performs image processing for the first image on the first image signals in a case where a light emission mode is set to the first illumination light emission mode. The image processing for the first image includes structure emphasis processing or tone emphasis processing for the first image and the like. The first image signals having been subjected to the image processing for the first image are input to the display control unit 70 as the first image. Furthermore, the image processing unit 62 performs image processing for the second image on the second image signals in a case where a light emission mode is set to the second illumination light emission mode. The image processing for the second image includes structure emphasis processing or tone emphasis processing for the second image and the like. The second image signals having been subjected to the image processing for the second image are input to the display control unit 70 as the second image.

The display control unit 70 performs control to display the normal image, the first image, and/or the second image, which are input from the image processing unit 62, as images that can be displayed by the monitor 18. An image corresponding to each mode is displayed by the control of the display control unit 70. The normal image is displayed on the monitor 18 in the normal light emission mode. Further, the first image is displayed on the monitor 18 in the first illumination light emission mode. Furthermore, the second image is displayed on the monitor 18 in the second illumination light emission mode.

In a case where a light amount-adjustment instruction is issued by the user interface 19, the light amount-adjustment instruction-generating unit 72 generates an instruction to adjust the light amount ratios of the normal light, the first illumination light, or the second illumination light to the light source device 14 as the light amount-adjustment instruction. In this case, a light amount display screen for displaying light amount ratios representing the levels of the relative amounts of illumination light of a plurality of wavelength ranges is displayed on the monitor 18 by the display control unit 70, and a user looks at the light amount display screen and operates the user interface 19, so that the light amount-adjustment instruction is issued. In a case where the light amount-adjustment instruction is issued, the display contents of the light amount display screen including the levels of the amounts of light are changed. Further, the light amount-adjustment instruction is sent to the light source device 14, and the light source control unit 21 controls the light emission intensity of the V-LED 20a, the B-LED 20b, the G-LED 20c, or the R-LED 20d on the basis of the light amount-adjustment instruction.

Figure 4:
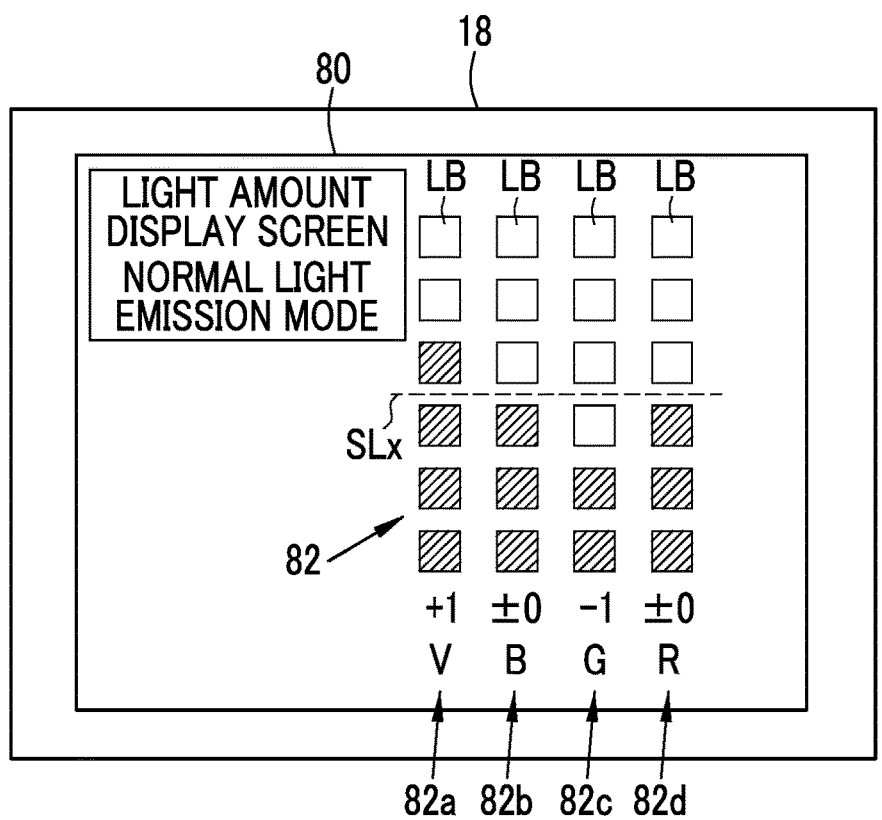
FIG. 4 is an image diagram of a monitor that displays a light amount display screen.

As shown in FIG. 4, the light amount display screen 80 includes a light amount level-display section 82 displaying the level of the amount of each illumination light. The light amount level-display section 82 comprises a V-light amount level-display section 82a that displays the level of the amount of violet light V emitted from the V-LED 20a, a B-light amount level-display section 82b that displays the level of the amount of blue light B emitted from the B-LED 20b, a G-light amount level-display section 82c that displays the level of the amount of green light G emitted from the G-LED 20c, and a R-light amount level-display section 82d that displays the level of the amount of red light R emitted from the R-LED 20d. Each of the light amount level-display sections 82a to 82d performs the display of an indicator, which displays the level of the amount of light stepwise, as display contents.

In this embodiment, on the light amount display screen 80, light amount display boxes LB, which divide the level of the amount of light into six stages, are arranged in a vertical direction and the level of the amount of light is indicated by the turn-on (with hatching) or turn-off (without hatching) of the light amount display boxes LB. Further, in a case where the half (three. the light amount display boxes LB corresponding to the first to third stages from below) of the six light amount display boxes are turned on in this embodiment to indicate how many stages the amount of light is higher or lower than the amount of light corresponding to the reference state, it is indicated that each illumination light has the amount of light corresponding to the reference state. In this case, "±0" is displayed on the light amount display screen 80.

On the other hand, in a case where the number of the light amount display boxes LB turned on is smaller than the half of the number of all the light amount display boxes, it is indicated that each illumination light has the amount of light smaller than the amount of light corresponding to the reference state. In this case, "−P %" is displayed on the light amount display screen 80 (P is a positive integer and indicates how many stages the amount of illumination light deviates from the amount of light corresponding to the reference state). Further, in a case where the number of the light amount display boxes LB turned on is larger than the half of the number of all the light amount display boxes, it is indicated that each illumination light has the amount of light larger than the amount of light corresponding to the reference state. In this case, "+P %" is displayed on the light amount display screen 80 (P is a positive integer and indicates how many stages the amount of illumination light deviates from the amount of light corresponding to the reference state). A reference line SLx is provided between the light amount display boxes LB corresponding to the third and fourth stages to show that the turn-on of the light amount display boxes LB corresponding to the first to third stages indicates the amount of light corresponding to the reference state.

A user operates the user interface 19 to issue a light amount-adjustment instruction to increase or reduce the amounts of violet light V, blue light B, green light G, and red light R between the first and third stages from the amount of light corresponding to the reference state. The light amount display boxes LB of the respective light amount level-display sections 82a to 82d are turned on or off in conjunction with this light amount-adjustment instruction. For example, in a case where the level of the amount of violet light V included in the normal light is increased from the amount of light corresponding to the reference state by one stage, the state of the light amount display box LB of the V-light amount level-display section 82a corresponding to the fourth stage from below is switched to a turn-on state from a turn-off state in addition to the turn-on of the light amount display boxes LB corresponding to the first to third stages. Further, a light amount-adjustment instruction to increase the amount of violet light V from the amount of light corresponding to the reference state by one stage is sent to the light source device 14. The light source control unit 21 controls the V-LED 20a to perform control to increase the intensity of violet light V on the basis of the light amount-adjustment instruction.

Since the respective reference light amount ratios are set for each light emission mode, the display contents of the light amount display screen 80 in the case of the reference light amount ratios are the same even in any light emission mode (the light amount display boxes LB corresponding to the first to third stages are turned on). That is, even though a light emission mode is switched, the light amount display screen is the same except for a portion thereof for indicating the light emission mode ("normal light emission mode" in FIG. 4).

Figure 5:
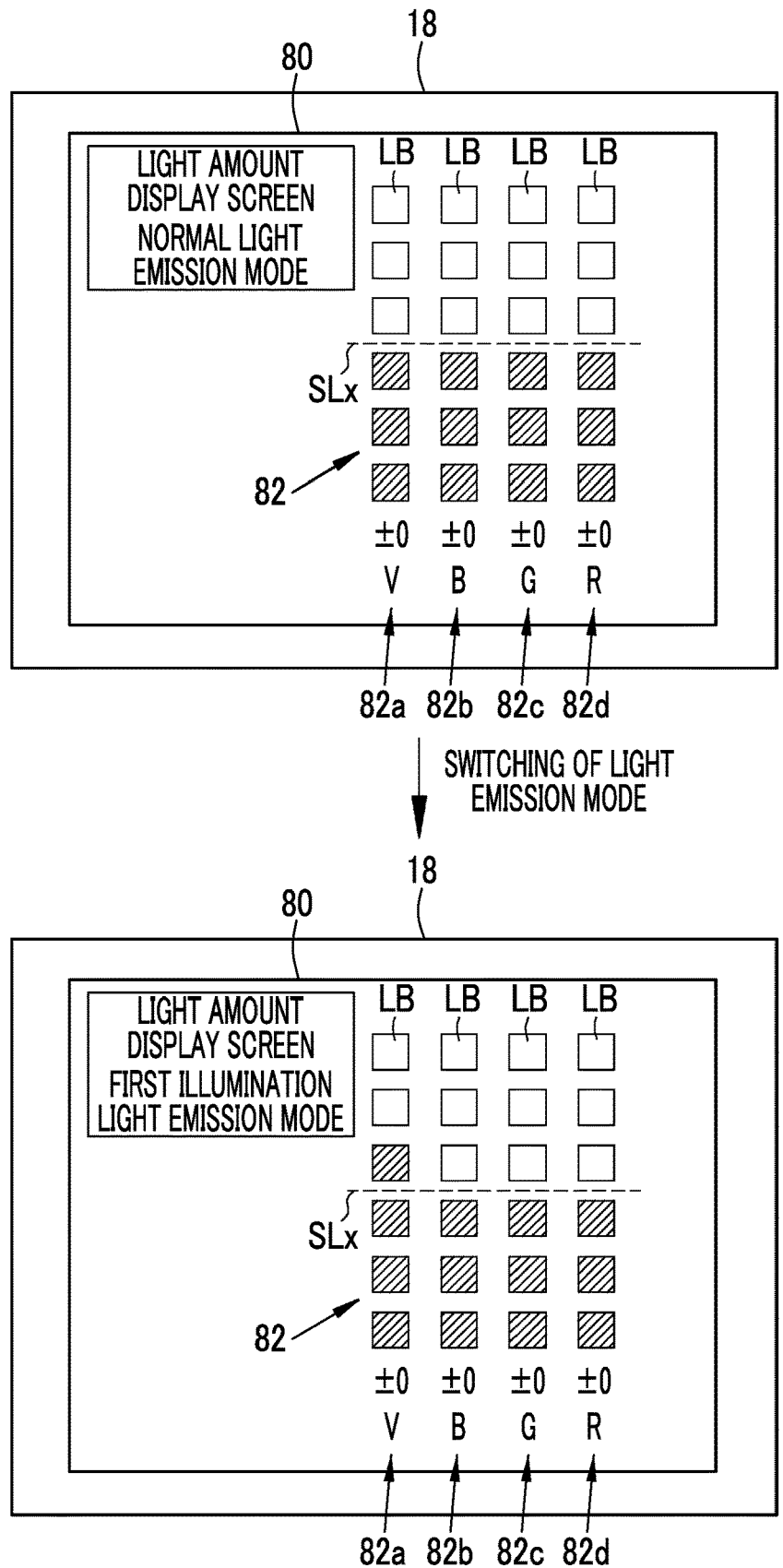
FIG. 5 is an image diagram of a monitor that displays a light amount display screen in a case where a light emission mode is switched.

The reference light amount ratios for any one light emission mode of the plurality of light emission modes may be used as the reference light amount ratios for the other light emission mode. For example, the reference light amount ratios of the normal light may be used as the reference light amount ratios of the first illumination light and the second illumination light. In this case, the display contents of the reference light amount ratios for each light emission mode are different from each other. For example, as shown FIG. 5, on the light amount display screen 80 in the normal light emission mode, the light amount display boxes LB of each of the light amount level-display sections 82a to 82d corresponding to the first to third stages are turned on in the case of the reference light amount ratios. On the other hand, in a case where a light emission mode is switched to the first illumination light emission mode, the light amount display boxes LB of each of the B-light amount level-display section 82b, the G-light amount level-display section 82c, and the R-light amount level-display section 82d corresponding to the first to third stages are turned on but the light amount display boxes LB of the V-light amount level-display section 82a corresponding to the first to fourth stages are turned on even in the case of the reference light amount ratios. The reason for this is that the amount of violet light V of the first illumination light is higher in a case where the reference light amount ratios of the first illumination light are compared with the reference light amount ratios of the normal light.

Figures 6, 7:
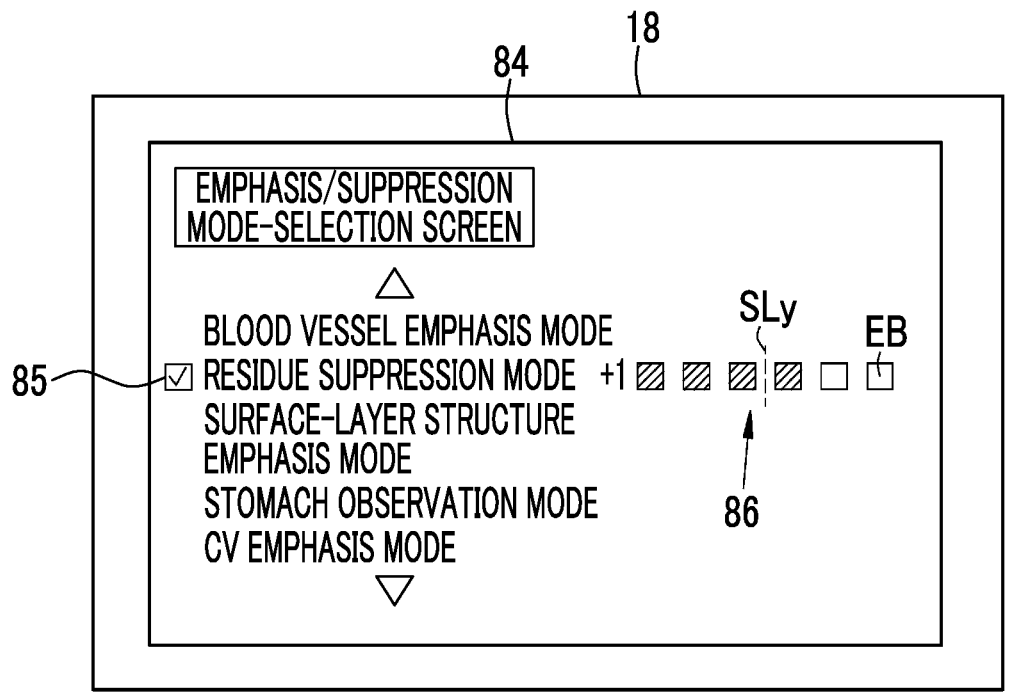
FIG. 6 is an image diagram of a monitor that displays an emphasis/suppression mode-selection screen.
FIG. 7 is a diagram showing the amounts of light to be adjusted with respect to the reference amounts of light for the respective emphasis/suppression modes in a normal light emission mode.

The emphasis/suppression mode-selecting unit 74 receives a user's operation performed by the emphasis/suppression mode-changeover SW 13b and selects a specific emphasis/suppression mode among the plurality of emphasis/suppression modes. As shown in FIG. 6, the plurality of emphasis/suppression modes serving as objects to be selected are displayed on an emphasis/suppression mode-selection screen 84 displayed on the monitor 18 and a user looks at the emphasis/suppression mode-selection screen 84 and operates the emphasis/suppression mode-changeover SW 13b, so that the specific emphasis/suppression mode is selected. A checkbox 85 for showing that a mode is currently selected is displayed on the left side of a currently selected emphasis/suppression mode on the emphasis/suppression mode-selection screen 84.

For example, since a checkbox 85 is displayed on the left side of the "residue suppression mode" in the case of FIG. 6, it is indicated that the "residue suppression mode" is selected. Specifically, whenever the emphasis/suppression mode-changeover SW 13b is pressed once, the selected emphasis/suppression mode is switched to the other emphasis/suppression mode. Further, in a case where the selected emphasis/suppression mode is to be determined, a user presses the emphasis/suppression mode-changeover SW 13b for a certain time to determine the selected emphasis/suppression mode as the specific emphasis/suppression mode selected by the emphasis/suppression mode-selecting unit 74. An order where the emphasis/suppression mode is switched is the order of, for example, the blood vessel emphasis mode, the residue suppression mode, the surface-layer structure emphasis mode, the stomach observation mode, and the CV emphasis mode, but does not need to be limited thereto.

The emphasis/suppression amount-setting instruction-generating unit 76 receives a user's operation performed by the emphasis/suppression mode-changeover SW 13b and generates an emphasis/suppression amount-setting instruction, which is an instruction to set the amount of emphasis/suppression required for emphasizing or suppressing a specific object to be observed or a specific region of interest, by adjusting the amount of illumination light for the specific emphasis/suppression mode. A user looks at the amount of emphasis/suppression for the selected specific emphasis/suppression mode displayed in an emphasis/suppression amount-display section 86 of the emphasis/suppression mode-selection screen 84 and operates the emphasis/suppression mode-changeover SW 13b, so that the emphasis/suppression amount-setting instruction is issued. In this case, the display contents of the emphasis/suppression mode-selection screen 84 are changed after the emphasis/suppression amount-setting instruction is issued.

Specifically, in a case where the selected specific emphasis/suppression mode is the residue suppression mode, emphasis/suppression amount boxes EB, which divide the amount of emphasis/suppression into six stages, are displayed in a horizontal direction on the right side of the residue suppression mode on the emphasis/suppression mode-selection screen 84. The amount of emphasis/suppression is indicated by the turn-on (with hatching) or turn-off (without hatching) of the emphasis/suppression amount boxes EB. Further, in a case where the half (three. the first to third emphasis/suppression amount boxes EB from the left) of the six emphasis/suppression amount boxes EB are turned on to indicate how many stages the amount of emphasis/suppression is higher or lower than the reference amount of emphasis/suppression, it is indicated that the amount of emphasis/suppression is the reference amount of emphasis/suppression. In this case, "±0" is displayed on the emphasis/suppression mode-selection screen 84.

On the other hand, in a case where the number of the emphasis/suppression amount boxes EB turned on is smaller than the half of the number of all the emphasis/suppression amount boxes, it is indicated that the amount of emphasis/suppression is smaller than the reference amount of emphasis/suppression. In this case, "−Q %" is displayed on the emphasis/suppression mode-selection screen 84 (Q is a positive integer and indicates how many stages the amount of emphasis/suppression deviates from the reference amount of emphasis/suppression). In a case where the number of the emphasis/suppression amount boxes EB turned on is larger than the half of the number of all the emphasis/suppression amount boxes, it is indicated that the amount of emphasis/suppression is larger than the reference amount of emphasis/suppression. In this case, "+Q %" is displayed on the emphasis/suppression mode-selection screen 84 (Q is a positive integer and indicates how many stages the amount of emphasis/suppression deviates from the reference amount of emphasis/suppression).

A reference line SLy is provided between the third and fourth emphasis/suppression amount boxes EB to show that the turn-on of the first to third emphasis/suppression amount boxes EB indicates the reference amount of emphasis/suppression. Further, in a case where the emphasis/suppression mode-changeover SW 13*b* can be operated in two stages of half-press and full-press, it is preferable that the emphasis/suppression mode-changeover SW 13*b* is adapted so that the amount of emphasis/suppression is larger than the reference amount of emphasis/suppression in the case of the half-press of the emphasis/suppression mode-changeover SW 13*b* and the amount of emphasis/suppression is smaller than the reference amount of emphasis/suppression in the case of the full-press of the emphasis/suppression mode-changeover SW 13*b*.

Furthermore, the emphasis/suppression amount-setting instruction generated by the emphasis/suppression amount-setting instruction-generating unit 76 is sent to the light amount-adjustment instruction-generating unit 72. The light amount-adjustment instruction-generating unit 72 generates a light amount-adjustment instruction on the basis of the emphasis/suppression amount-setting instruction. The light amount-adjustment instruction is generated for each light emission mode. Specifically, in a case where a light emission mode is the normal light emission mode and the amount of emphasis/suppression is the reference amount of emphasis/suppression in the emphasis/suppression amount-setting instruction, the amounts of light to be adjusted with respect to the amounts of light corresponding to the reference states for the respective emphasis/suppression modes are as shown in FIG. 7. After the light amount-adjustment instruction is stopped, the light source control unit 21 controls the light emission intensity of the V-LED 20*a*, the B-LED 20*b*, the G-LED 20*c*, or the R-LED 20*d* on the basis of the light amount-adjustment instruction in the same manner as described above.

The light amount ratio-adjustment ratios $\Delta V$, $\Delta B$, $\Delta G$, and $\Delta R$ of violet light V, blue light B, green light G, and red light R with respect to the reference light amount ratios Vc:Bc:Gc:Rc of the normal light in the respective modes are shown in FIG. 7. Among these light amount ratio-adjustment ratios, "±0%" indicates that the reference light amount ratio is used just as it is without the adjustment of a light amount ratio. On the other hand, "+X %" (X is a positive integer) indicates that a light amount ratio-adjustment ratio X % of the reference light amount ratio is added to the reference light amount ratio. For example, "10%" of the light amount ratio-adjustment ratio $\Delta V$ for the blood vessel emphasis mode indicates that 10% of the reference light amount ratio Vc is added to the reference light amount ratio Vc. Further, "−Y %" (Y is a positive integer) indicates that a light amount ratio-adjustment ratio Y % of the reference light amount ratio is subtracted from the reference light amount ratio. For example, "−10%" of the light amount ratio-adjustment ratio $\Delta V$ for the residue suppression mode indicates that 10% of the reference light amount ratio Vc is subtracted from the reference light amount ratio Vc.

In a case where the amount of emphasis/suppression is large with respect to the reference amount of emphasis/suppression in the emphasis/suppression amount-setting instruction, light amount ratio-adjustment ratios $\Delta V$, $\Delta B$, $\Delta G$, and $\Delta R$, which are increased so as to correspond to a difference between the reference amount of emphasis/suppression and the amount of emphasis/suppression, are used as the light amount ratio-adjustment ratios $\Delta V$, $\Delta B$, $\Delta G$, and $\Delta R$ of FIG. 7. On the other hand, in a case where the amount of emphasis/suppression is small with respect to the reference amount of emphasis/suppression in the emphasis/suppression amount-setting instruction, light amount ratio-adjustment ratios $\Delta V$, $\Delta B$, $\Delta G$, and $\Delta R$, which are reduced so as to correspond to a difference between the reference amount of emphasis/suppression and the amount of emphasis/suppression, are used as the light amount ratio-adjustment ratios $\Delta V$, $\Delta B$, $\Delta G$, and $\Delta R$ of FIG. 7.

The amounts of light to be adjusted, which increase the light amount ratios of violet light V and green light G with respect to the reference light amount ratios of the normal light, are used in the blood vessel emphasis mode to increase the amount of light to be absorbed by hemoglobin. The amounts of light to be adjusted, which reduce the light amount ratios of violet light V and green light G with respect to the reference light amount ratios of the normal light, are used in the residue suppression mode to reduce the amount of light to be absorbed by a residue. The amounts of light to be adjusted, which increase the light amount ratios of violet light V and blue light B with respect to the reference light amount ratios of the normal light, are used in the surface-layer structure emphasis mode to increase the visibility of surface-layer structures. The amounts of light to be adjusted, which increase the light amount ratios of green light G and red light R having high reflectivity from a mucous membrane in the digestive tract with respect to the reference light amount ratios of the normal light, are used in the stomach observation mode so that the inside of the stomach can be observed in a bright state. The amount of light to be adjusted, which increases or reduces the light amount ratio of red light R with respect to the reference light amount ratios of the normal light, is used in the CV emphasis mode to increase the components of reflected light of a red-light wavelength range.

Further, in a case where a light emission mode is the first illumination light emission mode and the amount of emphasis/suppression is the reference amount of emphasis/suppression in the emphasis/suppression amount-setting instruction, the amounts of light to be adjusted with respect to the amounts of light corresponding to the reference states for the respective emphasis/suppression modes are as shown in FIG. 8. Light amount ratio-adjustment ratios in the blood vessel emphasis mode, the residue suppression mode, and the surface-layer structure emphasis mode shown in FIG. 8 are slightly different from those in the normal light emission mode, but are substantially the same as those in the normal light emission mode. On the other hand, in the stomach emphasis mode, not only the amount of green light G to be adjusted but also the amounts of violet light V and blue light B to be adjusted are increased to further increase brightness. Further, in the CV emphasis mode, the intensity of violet light V included in the first illumination light is sufficiently high and the light amount ratio of red light R is not adjusted since the amount of red light does not need to be increased.

Further, in a case where a light emission mode is the second illumination light emission mode and the amount of emphasis/suppression is the reference amount of emphasis/suppression in the emphasis/suppression amount-setting instruction, the amounts of light to be adjusted with respect to the amounts of light corresponding to the reference states for the respective emphasis/suppression modes are as shown in FIG. 9. Light amount ratio-adjustment ratios in the blood vessel emphasis mode, the residue suppression mode, and the surface-layer structure emphasis mode shown in FIG. 9 are slightly different from those in the normal light emission mode, but are substantially the same as those in the normal light emission mode. On the other hand, in the stomach emphasis mode, not only the amount of green light G to be adjusted but also the amounts of violet light V, blue light B, and red light R to be adjusted are increased to further increase brightness. Further, in the CV emphasis mode, the intensity of violet light V included in the second illumination light is sufficiently high and the light amount ratio of red light R is not adjusted since the amount of red light does not need to be increased.

The light amount display screen 80 and the emphasis/suppression mode-selection screen 84 are separately displayed on the monitor 18 in the above description. However, both the light amount display screen 80 and the emphasis/suppression mode-selection screen 84 may be displayed on the monitor 18 as shown in FIGS. 10A to 10C and FIGS. 11A and 11B to allow a user to easily grasp the selection of a specific emphasis/suppression mode or a change in the display contents of the light amount display screen 80 and the emphasis/suppression mode-selection screen 84 corresponding to an emphasis/suppression amount-setting instruction.

In a case where both the light amount display screen 80 and the emphasis/suppression mode-selection screen 84 are displayed on the monitor 18, it is preferable that the display control unit 70 performs at least one of the change of the display contents of the light amount level-display section on the light amount display screen 80 in conjunction with the selection of a specific emphasis/suppression mode on the emphasis/suppression mode-selection screen 84, the change of the display contents of the light amount level-display section on the light amount display screen 80 in conjunction with the change of the display contents of the emphasis/suppression amount-display section 86 on the emphasis/suppression mode-selection screen 84, or the change of the display contents of the emphasis/suppression amount-display section on the emphasis/suppression mode-selection screen 84 in conjunction with the change of the display contents of the light amount level-display section on the light amount display screen 80.

Figure 10A:
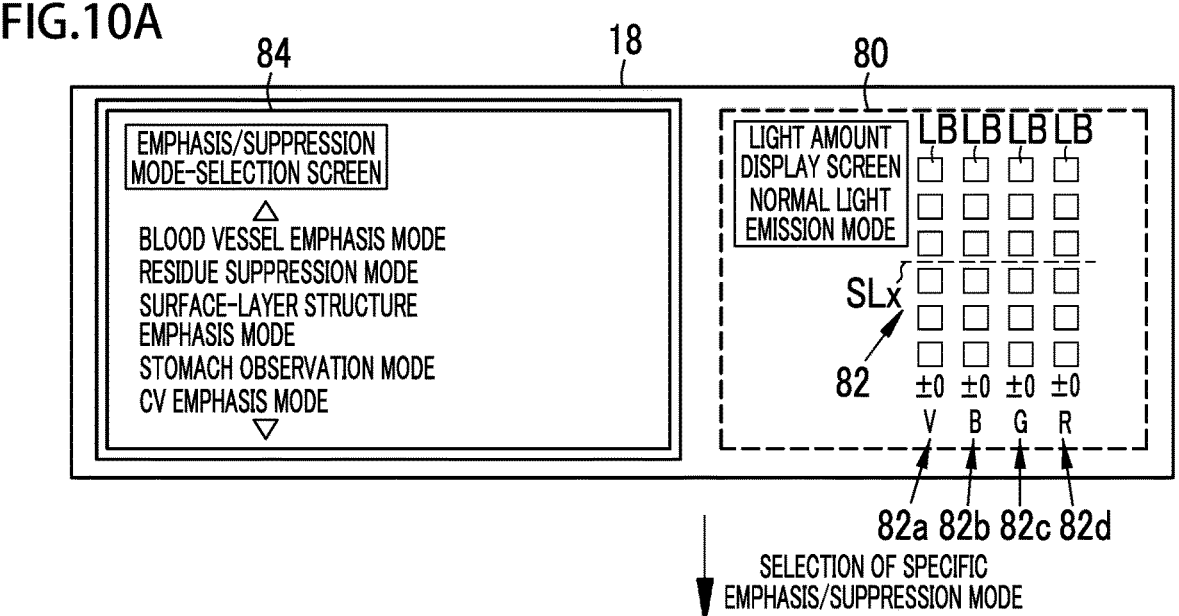
FIGS. 10A to 10C are diagrams showing that the display contents of a light amount level-display section on a light amount display screen are changed in conjunction with the selection of a specific emphasis/suppression mode and the display contents of the light amount level-display section on the light amount display screen is changed in conjunction with an emphasis/suppression amount-setting instruction.
Figure 10B:
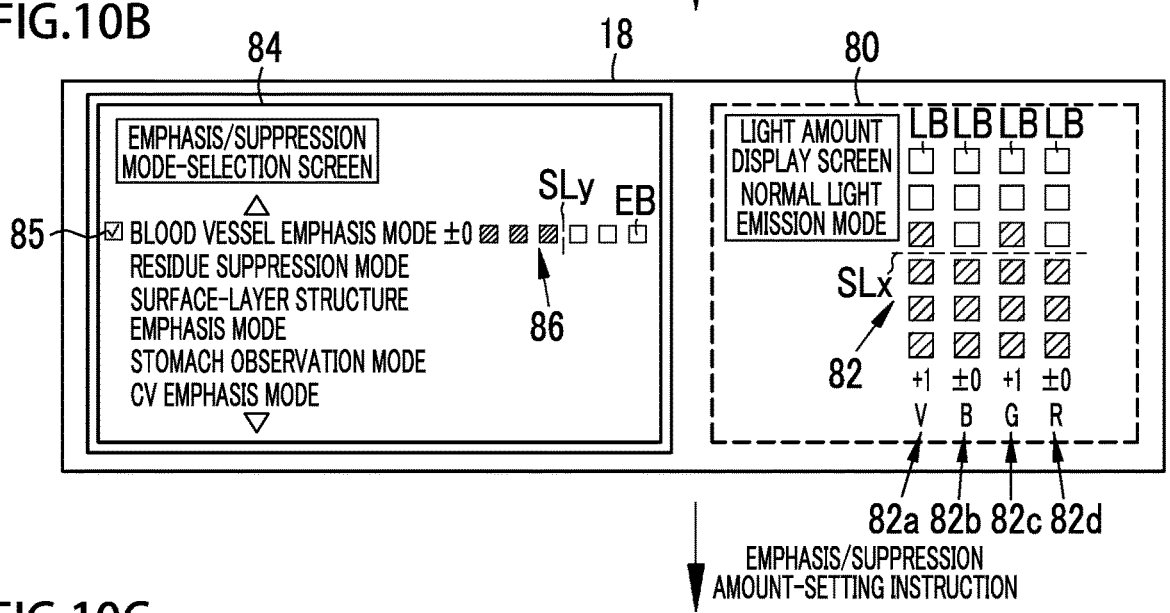
Figure 10C:
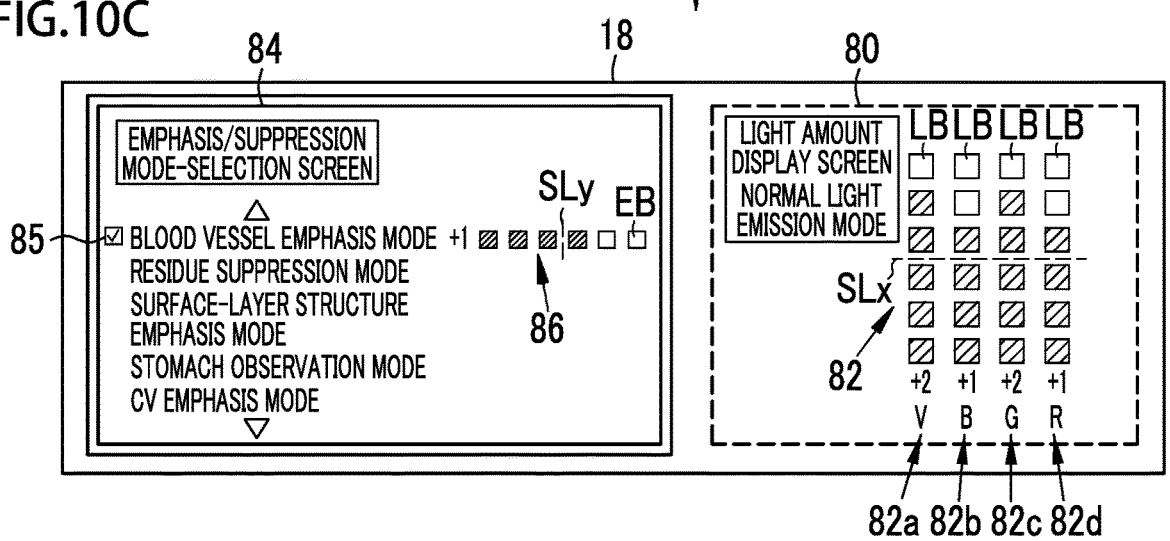

Specifically, in a case where a user can operate the emphasis/suppression mode-selection screen 84 (shown in FIGS. 10A to 10C by a double-line frame. The same applies to FIGS. 11A and 11B) and cannot operate the light amount display screen 80 (shown in FIGS. 10A to 10C by a dotted-line frame. The same applies to FIGS. 11A and 11B) as shown in FIG. 10A and the blood vessel emphasis mode is selected as a specific emphasis mode by the operation of the emphasis/suppression mode-changeover SW 13b, the V-light amount level-display section 82a, the B-light amount level-display section 82b, the G-light amount level-display section 82c, and the R-light amount level-display section 82d for the normal light corresponding to the blood vessel emphasis mode are displayed on the light amount display screen 80 as the display contents of the light amount level-display section as shown in FIG. 10B. Here, since the amount of emphasis/suppression on the emphasis/suppression mode-selection screen 84 is the reference amount of emphasis/suppression, the light amount display boxes LB corresponding to the first to third stages are turned on with regard to the respective light amount level-display sections 82a to 82d.

Then, the user operates the emphasis/suppression mode-changeover SW 13b to issue an emphasis/suppression amount-setting instruction, so that a light amount-adjustment instruction corresponding to the emphasis/suppression amount-setting instruction is generated. Further, the emphasis/suppression amount-setting instruction is performed, so that the display contents of the emphasis/suppression amount-display section 86 on the emphasis/suppression mode-selection screen 84 are changed. For example, in a case where the amount of emphasis/suppression is to be increased from the reference amount of emphasis/suppression by one stage according to the emphasis/suppression amount-setting instruction, the first to fourth emphasis/suppression amount boxes EB from the left are turned on.

Furthermore, the amounts of light to be adjusted are set according to the light amount-adjustment instruction based on the emphasis/suppression amount-setting instruction. The display contents of the light amount display screen 80 are changed according to the set amounts of light to be adjusted. For example, in a case where the amount of emphasis/suppression is increased from the reference amount of emphasis/suppression by one stage according to the emphasis/suppression amount-setting instruction, the light amount display box LB corresponding to the fifth stage is turned on in addition to the light amount display boxes LB corresponding to the first to fourth stages with regard to the V-light amount level-display section 82a and the G-light amount level-display section 82c and the light amount display box LB corresponding to the fourth stage is turned on in addition to the light amount display boxes LB corresponding to the first to third stages with regard to the B-light amount level-display section 82b and the R-light amount level-display section 82d on the light amount display screen 80 as shown in FIG. 10C.

Figure 11A:
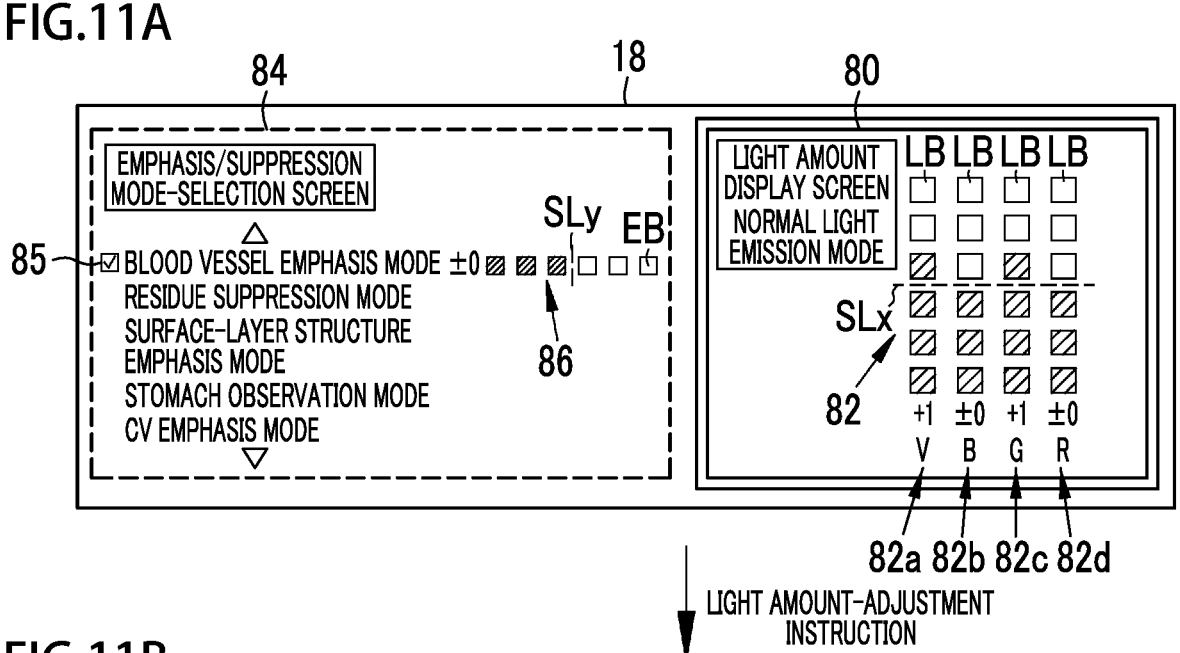
FIGS. 11A and 11B are diagrams showing that the display contents of an emphasis/suppression amount-display section on the emphasis/suppression mode-selection screen are changed in conjunction with a light amount-adjustment instruction.

On the other hand, in a case where the user can operate the light amount display screen 80 and cannot operate the emphasis/suppression mode-selection screen 84 as shown in FIG. 11A, a light emission mode is set to the normal light emission mode by the light emission mode-changeover SW 13a. In this case, the V-light amount level-display section 82a, the B-light amount level-display section 82b, the G-light amount level-display section 82c, and the R-light amount level-display section 82d for the normal light corresponding to the normal light emission mode are displayed on the light amount display screen 80 as the display contents of the light amount level-display section. Here, in a case where the light amount ratios are the reference light amount ratios, the light amount display boxes LB corresponding to the first to third stages are turned on with respect to the respective light amount level-display sections 82a to 82d. On the other hand, the first to third emphasis/suppression amount boxes EB are turned on with regard to the emphasis/suppression amount-display section 86 for the blood vessel emphasis mode on the emphasis/suppression mode-selection screen 84.

Figure 11B:
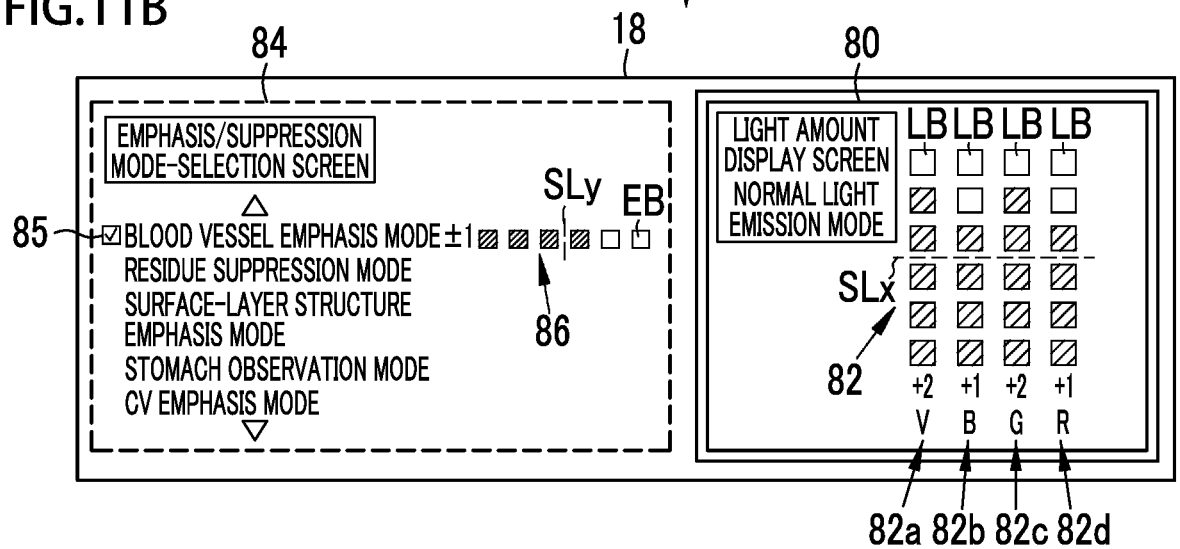

Then, in a case where a light amount-adjustment instruction to increase each of the amounts of violet light V, blue light B, green light G, and red light R by one stage is issued by the user interface 19, the light amount display boxes LB, which correspond to the first to fourth stages, of the B-light amount level-display section 82b and the R-light amount level-display section 82d are turned on and the light amount display boxes LB, which correspond to the first to fifth stages, of the V-light amount level-display section 82a and the G-light amount level-display section 82c are turned on as shown in FIG. 11B.

Then, the display contents of the emphasis/suppression amount-display section 86 on the emphasis/suppression mode-selection screen 84 are changed in conjunction with the change of the display contents of the respective light amount level-display sections on the light amount display screen 80. For example, in a case where the turn-on states of the respective light amount level-display sections 82a to 82d are changed as shown in FIG. 11B, the fourth emphasis/suppression amount box EB is turned on in addition to the first to third emphasis/suppression amount boxes EB on the emphasis/suppression mode-selection screen 84.

The image processing content-changing unit 78 changes the contents of image processing for the image signals in a case where a light amount-adjustment instruction is issued by the light amount-adjustment instruction-generating unit 72. Specifically, the image processing content-changing unit 78 changes a R-white balance gain coefficient that is to be multiplied by a red signal in the white balance processing unit 60, a G-white balance gain coefficient that is to be multiplied by a green signal in the white balance processing unit 60, and a B-white balance gain coefficient that is to be multiplied by a blue signal in the white balance processing unit 60, as the contents of the image processing. For example, in a case where the intensity ratios of violet light V and green light G are increased in the normal light emission mode according to the light amount-adjustment instruction, the G-white balance gain coefficient and the B-white balance gain coefficient are reduced but the R-white balance gain coefficient is increased. The image processing content-changing unit 78 changes the R-white balance gain coefficient and the like, but may change the contents of the linear matrix processing, which is performed by the DSP 56, according to the light amount-adjustment instruction.

Figures 12, 13:
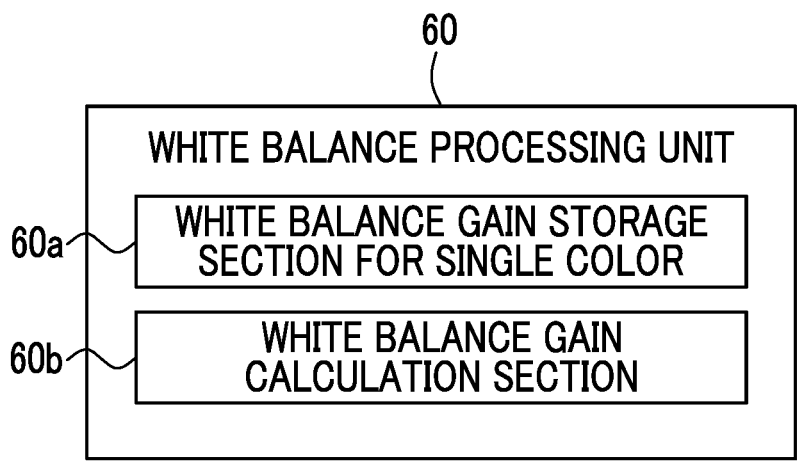
FIG. 12 is a block diagram showing the functions of a white balance processing unit.
FIG. 13 is a diagram showing R-white balance gain coefficients for a single color, G-white balance gain coefficients for a single color, and B-white balance gain coefficients for a single color.

Here, there is the following method as a method of changing the R-white balance gain coefficient, the G-white balance gain coefficient, and the B-white balance gain coefficient. For example, as shown in FIG. 12, a R-white balance gain coefficient for a single color, a G-white balance gain coefficient for a single color, and a B-white balance gain coefficient for a single color, which are obtained in a case where light is emitted only from each semiconductor light source, are stored in a white balance gain storage section 60a for a single color of the white balance processing unit 60. Then, a white balance gain calculation section 60b calculates the R-white balance gain coefficient, the G-white balance gain coefficient, and the B-white balance gain coefficient, which are changed by the image processing content-changing unit 78, on the basis of the light amount ratios of a plurality of kinds of illumination light changed according to the light amount-adjustment instruction, the R-white balance gain coefficient for a single color, the G-white balance gain coefficient for a single color, and the B-white balance gain coefficient for a single color.

The R-white balance gain coefficient for a single color ("R gain for single color" in FIG. 13) includes a R-white balance gain coefficient GRv for V light ("1.2" in FIG. 13) that is obtained in a case where a white subject is irradiated with violet light V, a R-white balance gain coefficient GRb for B light ("1.2" in FIG. 13) that is obtained in a case where a white subject is irradiated with blue light B, a R-white balance gain coefficient GRg for G light ("2.1" in FIG. 13) that is obtained in a case where a white subject is irradiated with green light G, and a R-white balance gain coefficient GRr for R light ("0.3" in FIG. 13) that is obtained in a case where a white subject is irradiated with red light R.

The G-white balance gain coefficient for a single color ("G gain for single color" in FIG. 13) includes a G-white balance gain coefficient GGv for V light ("1.0" in FIG. 13), a G-white balance gain coefficient GGb for B light ("1.0" in FIG. 13), a G-white balance gain coefficient GGg for G light ("1.0" in FIG. 13), and a G-white balance gain coefficient GGr for R light ("1.0" in FIG. 13). Further, the B-white balance gain coefficient for a single color ("B gain for single color" in FIG. 13) includes a B-white balance gain coefficient GBv for V light ("0.3" in FIG. 13), a B-white balance gain coefficient GBb for B light ("0.2" in FIG. 13), a B-white balance gain coefficient GBg for G light ("2.3" in FIG. 13), and a B-white balance gain coefficient GBr for R light ("2.2" in FIG. 13).

The white balance gain calculation section 60b calculates a R-white balance gain coefficient GR, a G-white balance gain coefficient GG, and a B-white balance gain coefficient GB, which are changed by the image processing content-changing unit 78, by the following equations (XR), (XG), and (XB) in a case where the light amount ratios of a plurality of kinds of illumination light changed according to the light amount-adjustment instruction are denoted by Vm:Bm:Gm:Rm.

$$GR = (Vm \times GRv + Bm \times GRb + Gm \times GRg + Rm \times GRr)/(Vm \times GGv + Bm \times GGb + Gm \times GGg + Rm \times GGr) \quad \text{Equation (XR):}$$

$$GG = (Vm \times GGv + Bm \times GGb + Gm \times GGg + Rm \times GGr)/(Vm \times GGv + Bm \times GGb + Gm \times GGg + Rm \times GGr) \quad \text{Equation (XG):}$$

$$GB = (Vm \times GBv + Bm \times GBb + Gm \times GBg + Rm \times GBr)/(Vm \times GGv + Bm \times GGb + Gm \times GGg + Rm \times GGr) \quad \text{Equation (XB):}$$

For example, in a case where Vm:Bm:Gm:Rm is "1:1:1:1" and the white balance gain coefficients shown in FIG. 13 are used, GR is "1.2", GG is "1.0", and GB is "1.3".

Figure 14:
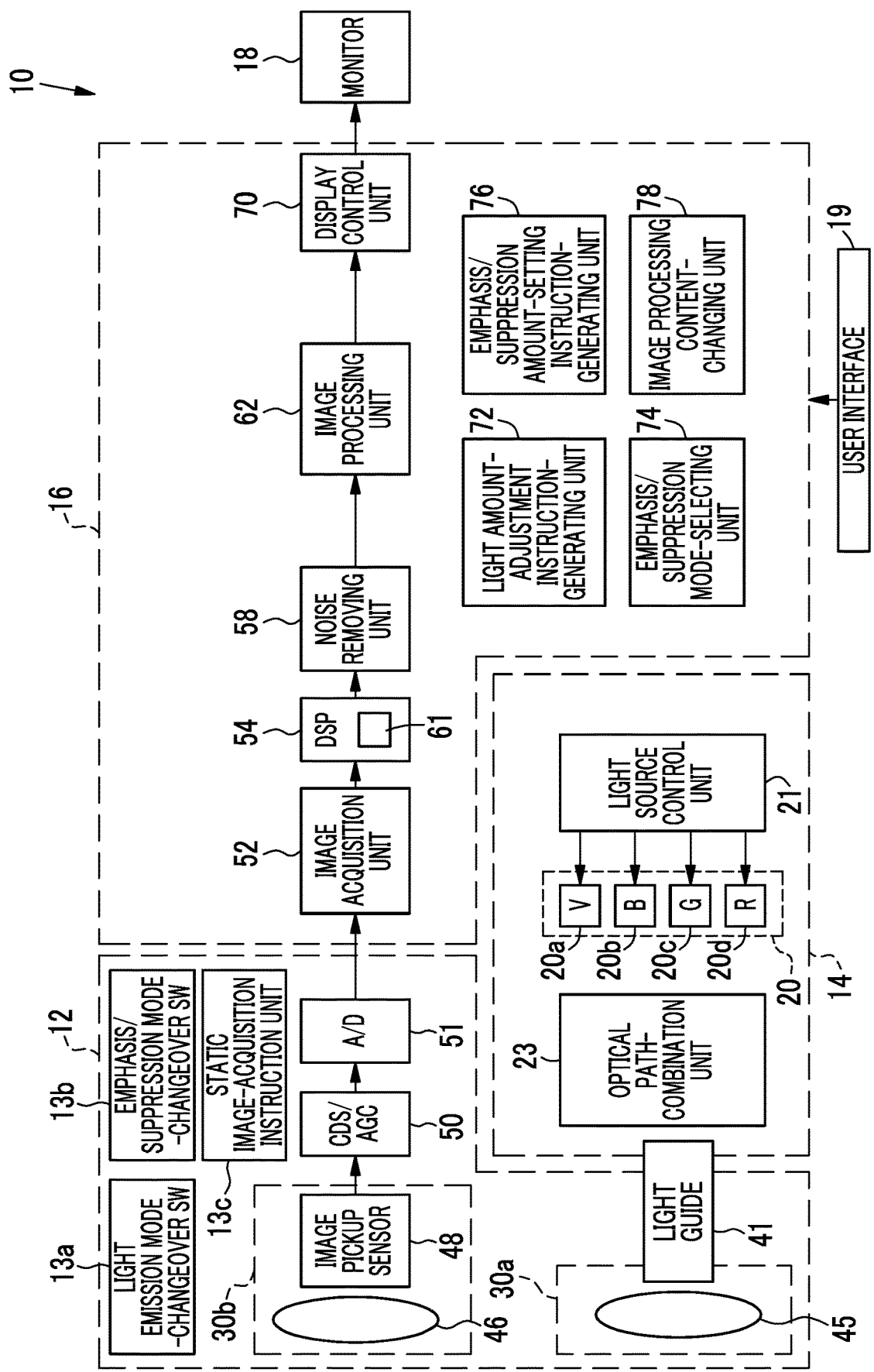
FIG. 14 is a block diagram showing an endoscope system comprising a mucous membrane color-adjustment processing unit.

In the above description, the image processing content-changing unit 78 changes the R-white balance gain coefficient and the like that are used in the white balance processing unit 60. However, in a case where a mucous membrane color-adjustment processing unit 61 for matching the tone of the entire image with a reddish mucous membrane color is used instead of the white balance processing unit 60 as shown in FIG. 14, the image processing content-changing unit 78 may change the processing contents of the mucous membrane color-adjustment processing unit 61.

In this case, the mucous membrane color-adjustment processing unit 61 multiplies a red signal by a R gain coefficient for adjusting a mucous membrane color, multiplies a green signal by a G gain coefficient for adjusting a mucous membrane color, and multiplies a blue signal by a B gain coefficient for adjusting a mucous membrane color. A red signal is divided by a green signal to obtain the R gain coefficient for adjusting a mucous membrane color. The red signal is obtained in a case where the image of a calibration sheet for the adjustment of a mucous membrane color having the reflection spectrum of a mucous membrane color, such as the reflection spectrum of hemoglobin, is picked up by the image pickup sensor 48, and the green signal is obtained in a case where the image of the calibration sheet for the adjustment of a mucous membrane color is picked up by the image pickup sensor 48. A green signal, which is obtained in a case where the image of the calibration sheet for the adjustment of a mucous membrane color is picked up by the image pickup sensor 48, is divided by a green signal, which is obtained in a case where the image of the calibration sheet for the adjustment of a mucous membrane color is picked up by the image pickup sensor 48, to obtain the G gain coefficient for adjusting a mucous membrane color. A blue signal, which is obtained in a case where the image of the calibration sheet for the adjustment of a mucous membrane color is picked up by the image pickup sensor 48, is divided by a green signal, which is obtained in a case where the image of the calibration sheet for the adjustment of a mucous membrane color is picked up by the image pickup sensor 48, to obtain the B gain coefficient for adjusting a mucous membrane color.

The image processing content-changing unit 78 changes the R gain coefficient for adjusting a mucous membrane color, the G gain coefficient for adjusting a mucous membrane color, the B gain coefficient for adjusting a mucous membrane color, as the contents of the image processing. For example, in a case where the intensity ratios of violet light V and green light G are increased in the normal light emission mode according to the light amount-adjustment instruction, the G gain coefficient for adjusting a mucous membrane color and the B gain coefficient for adjusting a mucous membrane color are reduced but the R gain coefficient for adjusting a mucous membrane color is increased.

As with the R-white balance gain coefficient and the like, a R gain coefficient for adjusting a mucous membrane color, a G gain coefficient for adjusting a mucous membrane color, and a B gain coefficient for adjusting a mucous membrane color may be calculated on the basis of the light amount ratios of a plurality of kinds of illumination light changed according to the light amount-adjustment instruction, and a R gain coefficient for adjusting a mucous membrane color for a single color, a G gain coefficient for adjusting a mucous membrane color for a single color, and a B gain coefficient for adjusting a mucous membrane color for a single color that are obtained in a case where light is emitted only from each semiconductor light source.

Figure 15:
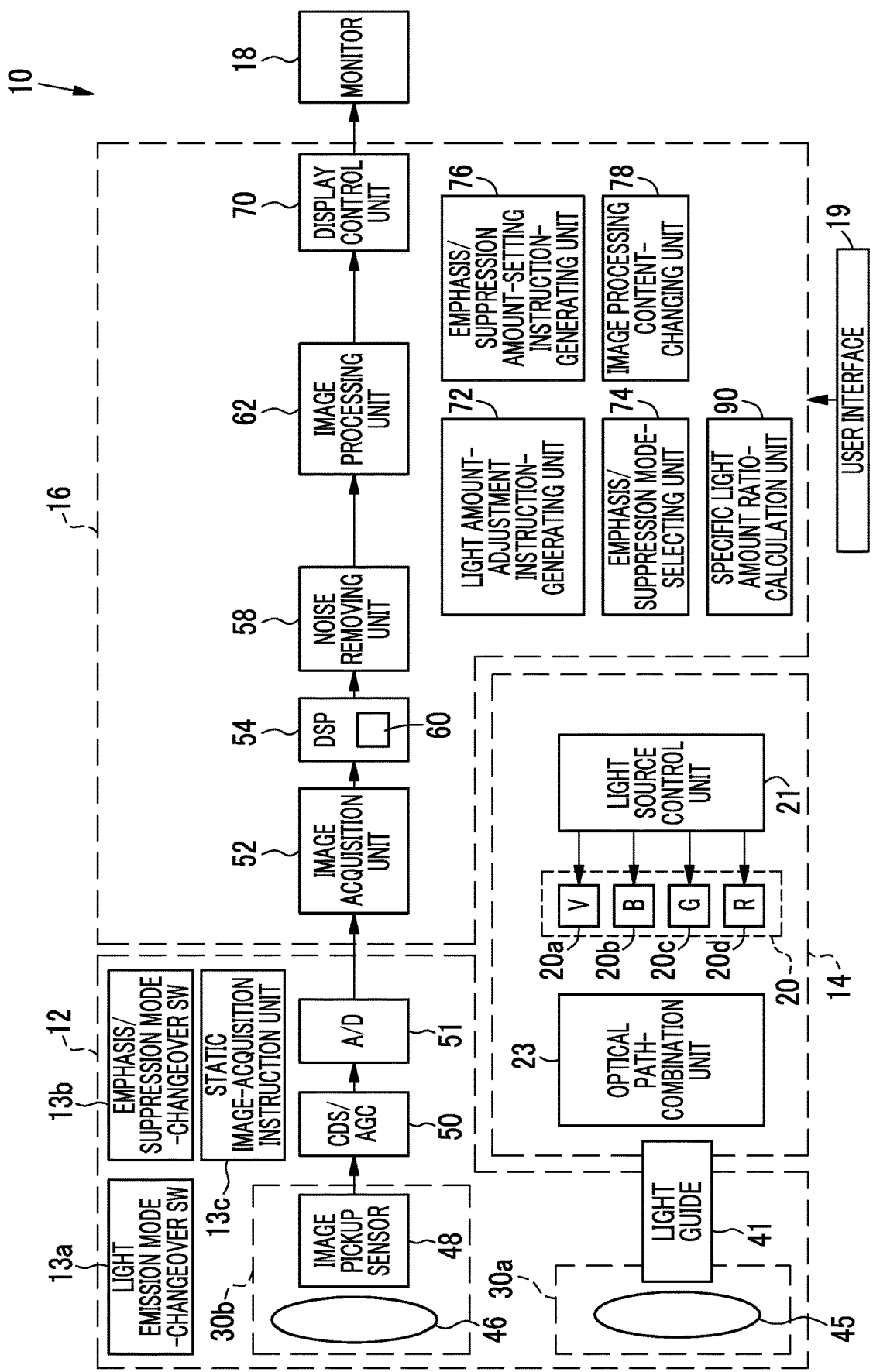
FIG. 15 is a block diagram showing an endoscope system comprising a specific light amount ratio-calculation unit.

In the above description, the level of the amount of each illumination light is adjusted on the basis of the display contents of the light amount display screen 80 and the like by a user's operation using the user interface 19. However, the level of the amount of each illumination light may be automatically adjusted on the basis of image signals that are obtained in a case where the image of an object to be observed is picked up. For example, as shown in FIG. 15, a specific light amount ratio-calculation unit 90 provided in the processor device 16 analyzes image signals and calculates specific light amount ratios that represents the light amount ratios of appropriate illumination light corresponding to an object to be observed. For example, structural information in the object to be observed is grasped from image signals, and a portion to be observed (for example, the stomach) is specified from the structural information. Then, light amount ratios suitable for the specified portion to be observed (for example, the amounts of green light G and red light R are larger than the amount of other color light in the case of the stomach) are calculated. A light amount-adjustment instruction is generated in the light amount-adjustment instruction-generating unit 72 on the basis of the specific light amount ratios. The display control unit 70 changes the display contents of the respective light amount level-display sections 82a to 82d according to the light amount-adjustment instruction so that light amount ratios are the specific light amount ratios. The specific light amount ratios obtained by the specific light amount ratio-calculation unit 90 are sent to the light source control unit 21. The light source control unit 21 controls the V-LED 20a, the B-LED 20b, the G-LED 20c, and the R-LED 20d so that light amount ratios are the specific light amount ratios.

Figure 16:
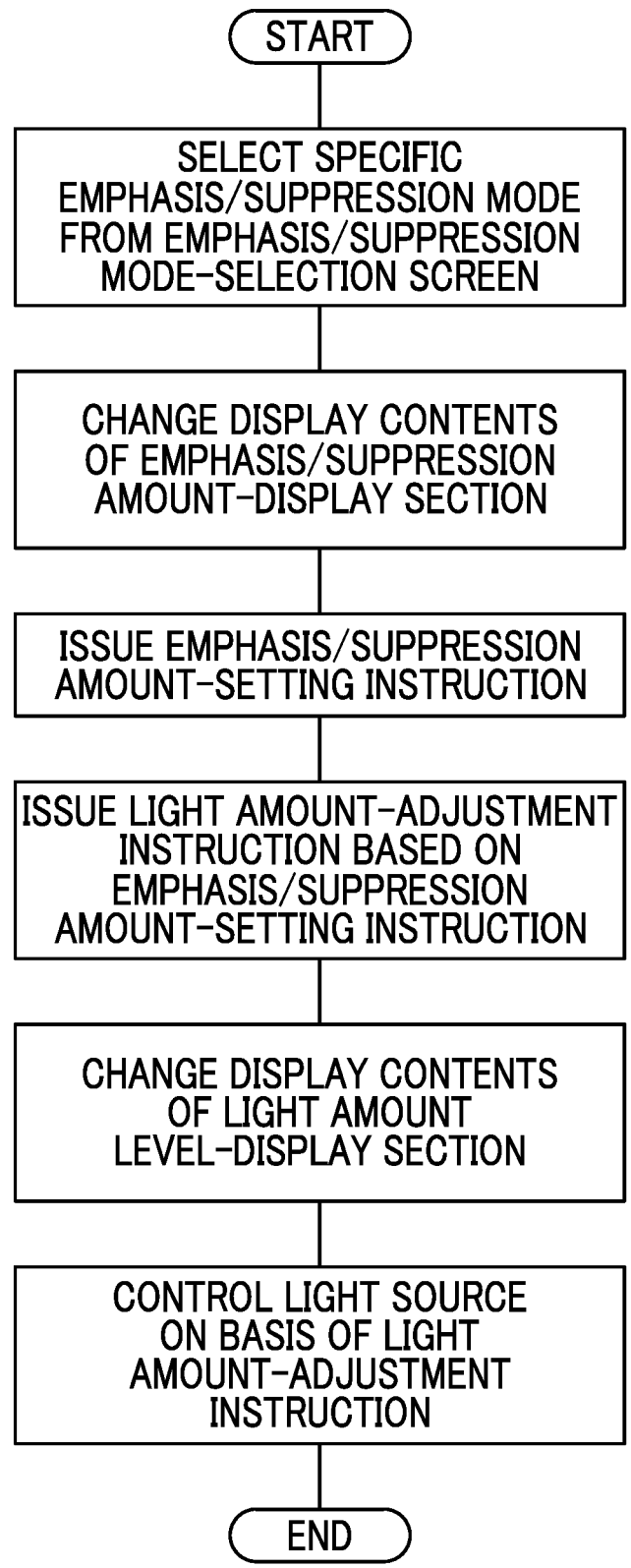
FIG. 16 is a flowchart showing a series of flow of the invention.

Next, a series of flow of the invention will be described with reference to a flowchart shown in FIG. 16. A user operates the user interface 19 to display the emphasis/suppression mode-selection screen 84 on the monitor 18. A plurality of emphasis/suppression modes are displayed on the emphasis/suppression mode-selection screen 84. The user operates the emphasis/suppression mode-changeover SW 13b to select a specific emphasis/suppression mode, which is to be used from now on, from the plurality of emphasis/suppression modes. In a case where the specific emphasis/suppression mode is selected, the display control unit 70 causes the checkbox 85 to be displayed at the selected specific emphasis/suppression mode on the monitor 18.

Further, in a case where the specific emphasis/suppression mode is selected, the display control unit 70 causes the emphasis/suppression amount-display section 86 to be displayed on the emphasis/suppression mode-selection screen 84. The user operates the emphasis/suppression mode-changeover SW 13b and changes the display contents of the emphasis/suppression amount-display section 86 so that the amount of emphasis/suppression is a target amount of emphasis/suppression. In a case where the amount of emphasis/suppression is the target amount of emphasis/suppression, the user operates the emphasis/suppression mode-changeover SW 13b, so that an emphasis/suppression amount-setting instruction is issued. The emphasis/suppression amount-setting instruction is sent to the light amount-adjustment instruction-generating unit 72, so that a light amount-adjustment instruction based on the emphasis/suppression amount-setting instruction is generated in the light amount-adjustment instruction-generating unit 72.

In a case where the light amount-adjustment instruction is generated, the display control unit 70 changes the display contents of the respective light amount level-display sections 82a to 82d on the light amount display screen 80 according to the light amount-adjustment instruction. Further, the light amount-adjustment instruction is sent to the light source device 14. The light source control unit 21 performs light source control FOR adjusting the light emission intensity of the V-LED 20a, the B-LED 20b, the G-LED 20c, or the R-LED 20d on the basis of the light amount-adjustment instruction.

In a case where a multi-observation mode in which the first illumination light and the second illumination light are switched and emitted at an interval of a specific frame is performed in the endoscope system 10, a first image and a second image, which are color image, may be switched and displayed on the monitor 18 according to the light emission period of the first illumination light and the light emission period of the second illumination light. For example, in a case where a light emission period K(N) is two frames and a light emission period L(N) is three frames, the first image continues to be displayed for two frames and the second image continues to be displayed for three frames.

The hardware structures of the processing units, which are included in the processor device 16 in the embodiment, such as the image acquisition unit 52, the DSP 54, the noise removing unit 58, the white balance processing unit 60, the white balance gain storage section 60a for a single color, the white balance gain calculation section 60b, the mucous membrane color-adjustment processing unit 61, the image processing unit 62, the display control unit 70, the light amount-adjustment instruction-generating unit 72, the emphasis/suppression mode-selecting unit 74, the emphasis/suppression amount-setting instruction-generating unit 76, the image processing content-changing unit 78, and the specific light amount ratio-calculation unit 90, are various processors to be described below. The various processors include: a central processing unit (CPU) that is a general-purpose processor functioning as various processing units by executing software (program); a programmable logic device (PLD) that is a processor of which circuit configuration can be changed after manufacture, such as a field programmable gate array (FPGA); a graphical processing unit (GPU); a dedicated electrical circuit that is a processor having circuit configuration designed exclusively to perform various kinds of processing; and the like.

One processing unit may be formed of one of these various processors, or may be formed of a combination of two or more same kind or different kinds of processors (for example, a plurality of FPGAs, a combination of a CPU and an FPGA, or a combination of a CPU and a GPU). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by a system-on-chip (SoC) or the like is used. In this way, various processing units are formed using one or more of the above-mentioned various processors as hardware structures.

In addition, the hardware structures of these various processors are more specifically electrical circuitry where circuit elements, such as semiconductor elements, are combined. Further, the hardware structure of the storage unit is a storage, such as a hard disc drive (HDD) or a solid state drive (SSD).

The invention can be applied to a processor device to be combined with a capsule endoscope system or various medical image processing devices other than the processor device to be combined with the endoscope system described in the embodiment.

An endoscope system according to another embodiment of the invention comprising:

a processor device causing a display control unit to allow a display unit to display at least one of a light amount display screen which is used to display light amount ratios representing a balance of levels of the amounts of illumination light of a plurality of wavelength ranges emitted from a plurality of semiconductor light sources and includes a light amount level-display section displaying the level of the amount of each illumination light and on which the levels of the amounts of light and display contents of the light amount level-display section are changed according to a light amount-adjustment instruction, or an emphasis/suppression mode-selection screen which is used to select a specific emphasis/suppression mode from a plurality of emphasis/suppression modes and includes an emphasis/suppression amount-display section displaying the amounts of emphasis for the emphasis/suppression modes and on which display contents of the emphasis/suppression amount-display section are changed according to an emphasis/suppression amount-setting instruction, wherein the display control unit performs at least one of change of the display contents of the light amount level-display section in conjunction with selection of the specific emphasis/suppression mode, change of the display contents of the light amount level-display section in conjunction with change of the display contents of the emphasis/suppression amount-display section, or change of the display contents of the emphasis/suppression amount-display section in conjunction with change of the display contents of the light amount level-display section.

EXPLANATION OF REFERENCES

10: endoscope system
12: endoscope
12a: insertion part
12b: operation part
12c: bendable part
12d: distal end part
12e: angle knob
13a: light emission mode-changeover SW
13b: emphasis/suppression mode-changeover SW
13c: static image-acquisition instruction unit
14: light source device
16: processor device
18: monitor
19: user interface
20: light source unit
20a: V-LED
20b: B-LED
20c: G-LED
20d: R-LED
21: light source control unit
23: optical path-combination unit
30a: illumination optical system
30b: image pickup optical system
41: light guide
45: illumination lens
46: objective lens
48: image pickup sensor
50: CDS/AGC circuit
51: A/D converter
52: image acquisition unit
54: DSP
58: noise removing unit
60: white balance processing unit 60a: white balance gain storage section for single color
60b: white balance gain calculation section
61: mucous membrane color-adjustment processing unit
62: image processing unit
70: display control unit
72: light amount-adjustment instruction-generating unit
74: emphasis/suppression mode-selecting unit
76: emphasis/suppression amount-setting instruction-generating unit
78: image processing content-changing unit
80: light amount display screen
82: light amount level-display section
82a: V-light amount level-display section
82b: B-light amount level-display section
82c: G-light amount level-display section
82d: R-light amount level-display section
84: emphasis/suppression mode-selection screen
85: checkbox
86: emphasis/suppression amount-display section
90: specific light amount ratio-calculation unit
SLx, SLy: reference line

What is claimed is:

1. An endoscope system comprising:
  a processor configured to function as:
    a display control unit allowing a display to display at least one of:
      a light amount display screen which is used to display light amount ratios representing levels of relative amounts of illumination light of a plurality of wavelength ranges emitted from a plurality of semiconductor light sources and includes a light amount level-display section displaying the level of the amount of each illumination light and on which display contents of the light amount level-display section including the level of the amount of each illumination light are changed according to a light amount-adjustment instruction; and
      an emphasis/suppression mode-selection screen which is used to select a specific emphasis/suppression mode from a plurality of emphasis/suppression modes and includes an emphasis/suppression amount-display section displaying amounts of emphasis for the emphasis/suppression modes and on which display contents of the emphasis/suppression amount-display section are changed according to an emphasis/suppression amount-setting instruction,
  wherein the display control unit performs at least one of:
    change of the display contents of the light amount level-display section in conjunction with selection of the specific emphasis/suppression mode;
    change of the display contents of the light amount level-display section in conjunction with change of the display contents of the emphasis/suppression amount-display section; and
    change of the display contents of the emphasis/suppression amount-display section in conjunction with change of the display contents of the light amount level-display section.

2. The endoscope system according to claim 1,
wherein the display displays both the light amount display screen and the emphasis/suppression mode-selection screen.

3. The endoscope system according to claim 1,
wherein, in a case where an operation is capable of being performed on the emphasis/suppression mode-selection screen, the display control unit performs the change of the display contents of the light amount level-display section in conjunction with the selection of the specific emphasis/suppression mode or performs the change of the display contents of the light amount level-display section in conjunction with the change of the display contents of the emphasis/suppression amount-display section, and
in a case where an operation is capable of being performed on the light amount display screen, the display control unit performs the change of the display contents of the emphasis/suppression amount-display section in conjunction with the change of the display contents of the light amount level-display section.

4. The endoscope system according to claim 2,
wherein, in a case where an operation is capable of being performed on the emphasis/suppression mode-selection screen, the display control unit performs the change of the display contents of the light amount level-display section in conjunction with the selection of the specific emphasis/suppression mode or performs the change of the display contents of the light amount level-display section in conjunction with the change of the display contents of the emphasis/suppression amount-display section, and
in a case where an operation is capable of being performed on the light amount display screen, the display control unit performs the change of the display contents of the emphasis/suppression amount-display section in conjunction with the change of the display contents of the light amount level-display section.

5. The endoscope system according to claim 1,
wherein a plurality of light emission modes in which light amount ratios of a plurality of kinds of illumination light are different from each other are provided,
the light amount display screen is provided for each of the light emission mode, and
the display control unit changes the display contents of the light amount level-display section on the light amount display screen corresponding to the light emission mode in conjunction with switching of the light emission mode.

6. The endoscope system according to claim 2,
wherein a plurality of light emission modes in which light amount ratios of a plurality of kinds of illumination light are different from each other are provided,
the light amount display screen is provided for each of the light emission mode, and
the display control unit changes the display contents of the light amount level-display section on the light amount display screen corresponding to the light emission mode in conjunction with switching of the light emission mode.

7. The endoscope system according to claim 3,
wherein a plurality of light emission modes in which light amount ratios of a plurality of kinds of illumination light are different from each other are provided,
the light amount display screen is provided for each of the light emission mode, and
the display control unit changes the display contents of the light amount level-display section on the light amount display screen corresponding to the light emission mode in conjunction with switching of the light emission mode.

8. The endoscope system according to claim 1, wherein the processor is further configured to function as:
  an image acquisition unit that acquires image signals obtained in a case where an image of an object to be observed illuminated with a plurality of kinds of illumination light emitted from the plurality of semiconductor light sources is picked up; and an image processing content-changing unit that changes contents of image processing for the image signals in a case where the light amount-adjustment instruction is issued.

9. The endoscope system according to claim 2, wherein the processor is further configured to function as:
an image acquisition unit that acquires image signals obtained in a case where an image of an object to be observed illuminated with a plurality of kinds of illumination light emitted from the plurality of semiconductor light sources is picked up; and
an image processing content-changing unit that changes contents of image processing for the image signals in a case where the light amount-adjustment instruction is issued.

10. The endoscope system according to claim 3, wherein the processor is further configured to function as:
an image acquisition unit that acquires image signals obtained in a case where an image of an object to be observed illuminated with a plurality of kinds of illumination light emitted from the plurality of semiconductor light sources is picked up; and
an image processing content-changing unit that changes contents of image processing for the image signals in a case where the light amount-adjustment instruction is issued.

11. The endoscope system according to claim 5, wherein the processor is further configured to function as:
an image acquisition unit that acquires image signals obtained in a case where an image of an object to be observed illuminated with a plurality of kinds of illumination light emitted from the plurality of semiconductor light sources is picked up; and
an image processing content-changing unit that changes contents of image processing for the image signals in a case where the light amount-adjustment instruction is issued.

12. The endoscope system according to claim 8,
wherein the image processing content-changing unit changes a R-white balance gain coefficient, a G-white balance gain coefficient, and a B-white balance gain coefficient, which are to be multiplied by the image signals, as the contents of the image processing.

13. The endoscope system according to claim 12, wherein the processor is further configured to function as:
a white balance gain storage section for a single color that stores a R-white balance gain coefficient for a single color, a G-white balance gain coefficient for a single color, and a B-white balance gain coefficient for a single color obtained in a case where light is emitted only from each semiconductor light source; and
a white balance gain calculation section that calculates the R-white balance gain coefficient, the G-white balance gain coefficient, and the B-white balance gain coefficient on the basis of changed light amount ratios of the plurality of kinds of illumination lights, the R-white balance gain coefficient for a single color, the G-white balance gain coefficient for a single color, and the B-white balance gain coefficient for a single color in a case where the light amount ratios are changed according to the light amount-adjustment instruction.

14. The endoscope system according to claim 8,
wherein the image processing content-changing unit changes a R gain coefficient for adjusting a mucous membrane color, a G gain coefficient for adjusting a mucous membrane color, and a B gain coefficient for adjusting a mucous membrane color, which are to be multiplied by the image signals, as the contents of the image processing.

15. The endoscope system according to claim 8, wherein the processor is further configured to function as:
a specific light amount ratio-calculation unit that analyzes the image signals and calculates specific light amount ratios corresponding to the object to be observed,
wherein light amount ratios of the illumination light are changed to the specific light amount ratios according to the light amount-adjustment instruction.

16. The endoscope system according to claim 1,
wherein the plurality of semiconductor light sources include a V-LED, a B-LED, a G-LED, and a R-LED.

17. A method of operating an endoscope system, the method comprising:
a display control step of causing a processor to perform control such that a display displays at least one of:
a light amount display screen which is used to display light amount ratios representing levels of the relative amounts of illumination light of a plurality of wavelength ranges emitted from a plurality of semiconductor light sources and includes a light amount level-display section displaying the level of the amount of each illumination light and on which display contents of the light amount level-display section including the level of the amount of each illumination light are changed according to a light amount-adjustment instruction; and
an emphasis/suppression mode-selection screen which is used to select a specific emphasis/suppression mode from a plurality of emphasis/suppression modes and includes an emphasis/suppression amount-display section displaying amounts of emphasis for the emphasis/suppression modes and on which display contents of the emphasis/suppression amount-display section are changed according to an emphasis/suppression amount-setting instruction,
wherein the display control step performs at least one of:
change of the display contents of the light amount level-display section in conjunction with selection of the specific emphasis/suppression mode;
change of the display contents of the light amount level-display section in conjunction with change of the display contents of the emphasis/suppression amount-display section; and
change of the display contents of the emphasis/suppression amount-display section in conjunction with change of the display contents of the light amount level-display section.

* * * * *